US011449234B1

(12) United States Patent
Danilov et al.

(10) Patent No.: US 11,449,234 B1
(45) Date of Patent: Sep. 20, 2022

(54) EFFICIENT DATA ACCESS OPERATIONS VIA A MAPPING LAYER INSTANCE FOR A DOUBLY MAPPED REDUNDANT ARRAY OF INDEPENDENT NODES

(71) Applicant: EMC IP Holding Company LLC, Hopkinton, MA (US)

(72) Inventors: Mikhail Danilov, Saint Petersburg (RU); Konstantin Buinov, Prague (CZ)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/333,815

(22) Filed: May 28, 2021

(51) Int. Cl.
*G06F 3/06* (2006.01)
(52) U.S. Cl.
CPC .......... *G06F 3/0611* (2013.01); *G06F 3/0604* (2013.01); *G06F 3/0631* (2013.01); *G06F 3/0659* (2013.01); *G06F 3/0689* (2013.01)
(58) Field of Classification Search
CPC .... G06F 3/0611; G06F 3/0604; G06F 3/0659; G06F 3/0689
See application file for complete search history.

(56) References Cited

U.S. PATENT DOCUMENTS

| 5,675,802 | A | 10/1997 | Allen et al. |
| 5,805,788 | A | 9/1998 | Johnson |
| 5,950,225 | A | 9/1999 | Kleiman |
| 6,073,218 | A | 6/2000 | Dekoning et al. |
| 6,108,684 | A | 8/2000 | Dekoning et al. |
| 6,233,696 | B1 | 5/2001 | Kedem |
| 6,240,527 | B1 | 5/2001 | Schneider et al. |
| 6,502,243 | B1 | 12/2002 | Thomas |
| 6,549,921 | B1 | 4/2003 | Ofek |
| 7,007,044 | B1 | 2/2006 | Rafert et al. |
| 7,103,884 | B2 | 9/2006 | Fellin et al. |

(Continued)

OTHER PUBLICATIONS

Changxun Wu and R. Burns, "Improving I/O Performance of Clustered Storage Systems by Adaptive Request Distribution," 2006 15th IEEE International Conference on High Performance Distributed Computing, 2006, pp. 207-217, doi: 10.1109/HPDC.2006.1652152. (Year: 2006).*

(Continued)

*Primary Examiner* — Khoa D Doan
(74) *Attorney, Agent, or Firm* — Amin, Turocy & Watson, LLP

(57) ABSTRACT

Efficient handling of disk input/output (I/O) operations is disclosed for a storage system supporting a doubly mapped redundant array of independent nodes. Delegating I/O operation management to a mapping layer component can support adapting I/O operation performance based on a topology of a real cluster supporting doubly mapped clusters. In traditional techniques, some corresponding real node topologies can result in inefficiently moving data from a first real node to a second real node and then promptly moving it back from the second real node to the first real node. These, and other, inefficient disk I/O conditions can be mitigated or avoided based on the presently disclosed techniques that can support more direct access to mapping information. Moreover, the disclosed techniques can support proportionately adapting an order of performing I/O operations due to the inherent isolation of real nodes and real clusters in accord with the disclosed subject matter.

20 Claims, 10 Drawing Sheets

(56) References Cited

U.S. PATENT DOCUMENTS

| | | |
|---|---|---|
| 7,389,393 B1 | 6/2008 | Karr et al. |
| 7,577,091 B2 | 8/2009 | Antal et al. |
| 7,631,051 B1 | 12/2009 | Fein et al. |
| 7,636,814 B1 | 12/2009 | Karr et al. |
| 7,664,839 B1 | 2/2010 | Karr et al. |
| 7,680,875 B1 | 3/2010 | Shopiro et al. |
| 7,694,191 B1 | 4/2010 | Bono et al. |
| 7,721,044 B1 | 5/2010 | Chatterjee et al. |
| 7,653,792 B2 | 6/2010 | Shimada et al. |
| 7,752,403 B1 | 7/2010 | Weinman, Jr. |
| 7,895,394 B2 | 2/2011 | Nakajima et al. |
| 8,125,406 B1 | 2/2012 | Jensen et al. |
| 8,261,033 B1 | 9/2012 | Slik et al. |
| 8,370,542 B2 | 2/2013 | Lu et al. |
| 8,429,514 B1 | 4/2013 | Goel |
| 8,479,037 B1 | 7/2013 | Chatterjee et al. |
| 8,495,465 B1 | 7/2013 | Anholt et al. |
| 8,504,518 B1 | 8/2013 | Ghemawat et al. |
| 8,540,625 B2 | 9/2013 | Miyoshi |
| 8,683,205 B2 | 3/2014 | Resch et al. |
| 8,725,986 B1 | 5/2014 | Goel |
| 8,751,599 B2 | 6/2014 | Tran et al. |
| 8,751,740 B1 | 6/2014 | De Forest et al. |
| 8,751,897 B2 | 6/2014 | Borthakur et al. |
| 8,799,746 B2 | 8/2014 | Baker et al. |
| 8,832,234 B1 | 9/2014 | Brooker et al. |
| 8,856,619 B1 | 10/2014 | Cypher |
| 8,856,624 B1 | 10/2014 | Paniconi |
| 8,892,938 B1 | 11/2014 | Sundaram et al. |
| 8,972,478 B1 | 3/2015 | Storer et al. |
| 9,003,086 B1 | 4/2015 | Schuller et al. |
| 9,021,296 B1 | 4/2015 | Kiselev et al. |
| 9,037,825 B1 | 5/2015 | Donlan et al. |
| 9,052,942 B1 | 6/2015 | Barber et al. |
| 9,063,838 B1 | 6/2015 | Boyle et al. |
| 9,098,447 B1 | 8/2015 | Donlan et al. |
| 9,128,910 B1 | 9/2015 | Dayal et al. |
| 9,208,009 B2 | 12/2015 | Resch et al. |
| 9,218,135 B2 | 12/2015 | Miller et al. |
| 9,244,761 B2 | 1/2016 | Yekhanin et al. |
| 9,268,783 B1 | 2/2016 | Shilane et al. |
| 9,274,903 B1 | 3/2016 | Garlapati et al. |
| 9,280,430 B2 | 3/2016 | Sarfare et al. |
| 9,405,483 B1 | 8/2016 | Wei et al. |
| 9,411,717 B2 | 8/2016 | Goss et al. |
| 9,442,802 B2 | 9/2016 | Hung |
| 9,477,682 B1 | 10/2016 | Bent et al. |
| 9,495,241 B2 | 11/2016 | Flynn et al. |
| 9,619,256 B1 | 4/2017 | Natanzon et al. |
| 9,641,615 B1 | 5/2017 | Robins et al. |
| 9,665,428 B2 | 5/2017 | Vairavanathan et al. |
| 9,747,057 B1 | 8/2017 | Ramani et al. |
| 9,817,713 B2 | 11/2017 | Gupta et al. |
| 9,864,527 B1 | 1/2018 | Srivastav et al. |
| 9,942,084 B1 | 4/2018 | Sorenson, III |
| 9,971,649 B2 | 5/2018 | Dhuse et al. |
| 10,001,947 B1 | 6/2018 | Chatterjee et al. |
| 10,007,561 B1 | 6/2018 | Pudipeddi et al. |
| 10,055,145 B1 | 8/2018 | Danilov et al. |
| 10,061,668 B1 | 8/2018 | Lazier et al. |
| 10,089,026 B1 | 10/2018 | Puhov et al. |
| 10,097,659 B1 | 10/2018 | Rao |
| 10,108,819 B1 | 10/2018 | Donlan et al. |
| 10,127,234 B1 | 11/2018 | Krishnan et al. |
| 10,216,770 B1 | 2/2019 | Kulesza et al. |
| 10,242,022 B1 | 3/2019 | Jain et al. |
| 10,282,262 B2 | 5/2019 | Panara et al. |
| 10,289,488 B1 | 5/2019 | Danilov et al. |
| 10,331,516 B2 | 6/2019 | Danilov et al. |
| 10,361,810 B2 | 7/2019 | Myung et al. |
| 10,387,546 B1 | 8/2019 | Duran et al. |
| 10,496,330 B1 | 12/2019 | Bernat et al. |
| 10,503,611 B1 | 12/2019 | Srivastav et al. |
| 10,567,009 B2 | 2/2020 | Yang et al. |
| 10,579,490 B2 | 3/2020 | Danilov et al. |
| 10,613,780 B1 | 4/2020 | Naeni et al. |
| 10,628,043 B1 | 4/2020 | Chatterjee et al. |
| 10,644,408 B2 | 5/2020 | Sakai et al. |
| 10,671,431 B1 | 6/2020 | Dolan et al. |
| 10,705,911 B2 | 7/2020 | Vishnumolakala et al. |
| 10,733,053 B1 | 8/2020 | Miller et al. |
| 10,740,183 B1 | 8/2020 | Blaum et al. |
| 10,754,845 B2 | 8/2020 | Danilov et al. |
| 10,761,931 B2 | 9/2020 | Goyal et al. |
| 10,797,863 B2 | 10/2020 | Chen et al. |
| 10,846,003 B2 | 11/2020 | Danilov et al. |
| 10,951,236 B2 | 3/2021 | Chen et al. |
| 11,023,331 B2 | 6/2021 | Danilov et al. |
| 2002/0049883 A1 | 4/2002 | Schneider et al. |
| 2002/0166026 A1 | 11/2002 | Ulrich et al. |
| 2002/0191311 A1 | 12/2002 | Ulrich et al. |
| 2003/0016596 A1 | 1/2003 | Chiquoine et al. |
| 2005/0027938 A1 | 2/2005 | Burkey |
| 2005/0071546 A1 | 3/2005 | Delaney et al. |
| 2005/0080982 A1 | 4/2005 | Vasilevsky et al. |
| 2005/0088318 A1 | 4/2005 | Liu et al. |
| 2005/0108775 A1 | 5/2005 | Bachar et al. |
| 2005/0140529 A1 | 6/2005 | Choi et al. |
| 2005/0234941 A1 | 10/2005 | Watanabe |
| 2006/0047896 A1 | 3/2006 | Nguyen et al. |
| 2006/0075007 A1 | 4/2006 | Anderson et al. |
| 2006/0143508 A1 | 6/2006 | Mochizuki et al. |
| 2006/0212744 A1 | 9/2006 | Benner et al. |
| 2006/0265211 A1 | 11/2006 | Canniff et al. |
| 2007/0076321 A1 | 4/2007 | Takahashi et al. |
| 2007/0239759 A1 | 10/2007 | Shen et al. |
| 2007/0250674 A1 | 10/2007 | Findberg et al. |
| 2008/0222480 A1 | 9/2008 | Huang et al. |
| 2008/0222481 A1 | 9/2008 | Huang et al. |
| 2008/0244353 A1 | 10/2008 | Dholakia et al. |
| 2008/0320061 A1 | 12/2008 | Aszmann et al. |
| 2009/0070771 A1 | 3/2009 | Yuyitung et al. |
| 2009/0113034 A1 | 4/2009 | Krishnappa et al. |
| 2009/0132543 A1 | 5/2009 | Chatley et al. |
| 2009/0172464 A1 | 7/2009 | Pyrne et al. |
| 2009/0183056 A1 | 7/2009 | Aston |
| 2009/0204959 A1 | 8/2009 | Anand et al. |
| 2009/0240880 A1 | 9/2009 | Kawaguchi |
| 2009/0259882 A1 | 10/2009 | Shellhamer |
| 2010/0031060 A1 | 2/2010 | Chew et al. |
| 2010/0094963 A1 | 4/2010 | Zuckerman et al. |
| 2010/0174968 A1 | 7/2010 | Charles et al. |
| 2010/0218037 A1 | 8/2010 | Swartz et al. |
| 2010/0293348 A1 | 11/2010 | Ke et al. |
| 2010/0332748 A1 | 12/2010 | Van Der Goot et al. |
| 2011/0029836 A1 | 2/2011 | Dhuse et al. |
| 2011/0040937 A1 | 2/2011 | Augenstein et al. |
| 2011/0066882 A1 | 3/2011 | Walls et al. |
| 2011/0106972 A1 | 5/2011 | Grube et al. |
| 2011/0107165 A1 | 5/2011 | Resch et al. |
| 2011/0138148 A1 | 6/2011 | Friedman et al. |
| 2011/0161712 A1 | 6/2011 | Athalye et al. |
| 2011/0191536 A1 | 8/2011 | Mizuno et al. |
| 2011/0196833 A1 | 8/2011 | Drobychev et al. |
| 2011/0246503 A1 | 10/2011 | Bender et al. |
| 2011/0292054 A1 | 12/2011 | Boker et al. |
| 2012/0023291 A1 | 1/2012 | Zeng et al. |
| 2012/0096214 A1 | 4/2012 | Lu et al. |
| 2012/0191675 A1 | 7/2012 | Kim et al. |
| 2012/0191901 A1 | 7/2012 | Norair |
| 2012/0204077 A1 | 8/2012 | D'Abreu et al. |
| 2012/0233117 A1 | 9/2012 | Holt et al. |
| 2012/0311395 A1 | 12/2012 | Leggette et al. |
| 2012/0317234 A1 | 12/2012 | Bohrer et al. |
| 2012/0321052 A1 | 12/2012 | Morrill et al. |
| 2013/0013564 A1 | 1/2013 | Ben-Or et al. |
| 2013/0047187 A1 | 2/2013 | Frazier et al. |
| 2013/0054822 A1 | 2/2013 | Mordani et al. |
| 2013/0067159 A1 | 3/2013 | Mehra |
| 2013/0067187 A1 | 3/2013 | Moss et al. |
| 2013/0088501 A1 | 4/2013 | Fell |
| 2013/0097470 A1 | 4/2013 | Hwang et al. |
| 2013/0145208 A1 | 6/2013 | Yen et al. |
| 2013/0238932 A1 | 9/2013 | Resch |

(56) References Cited

U.S. PATENT DOCUMENTS

| | | |
|---|---|---|
| 2013/0246876 A1 | 9/2013 | Manssour et al. |
| 2013/0290482 A1 | 10/2013 | Leggette |
| 2013/0305365 A1 | 11/2013 | Rubin et al. |
| 2014/0040417 A1 | 2/2014 | Galdwin et al. |
| 2014/0064048 A1 | 3/2014 | Cohen et al. |
| 2014/0115182 A1 | 4/2014 | Sabaa et al. |
| 2014/0122745 A1 | 5/2014 | Singh et al. |
| 2014/0149794 A1 | 5/2014 | Shetty et al. |
| 2014/0164430 A1 | 6/2014 | Hadjieleftheriou et al. |
| 2014/0164694 A1 | 6/2014 | Storer |
| 2014/0172930 A1 | 6/2014 | Molaro et al. |
| 2014/0250450 A1 | 9/2014 | Yu et al. |
| 2014/0280375 A1 | 9/2014 | Rawson et al. |
| 2014/0281804 A1 | 9/2014 | Resch |
| 2014/0297955 A1 | 10/2014 | {Amazaki et al. |
| 2014/0304460 A1 | 10/2014 | Carlson, Jr. et al. |
| 2014/0331100 A1 | 11/2014 | Dhuse et al. |
| 2014/0351633 A1 | 11/2014 | Grube et al. |
| 2014/0358972 A1 | 12/2014 | Guarrieri et al. |
| 2014/0359244 A1 | 12/2014 | Chambliss et al. |
| 2014/0380088 A1 | 12/2014 | Bennett et al. |
| 2014/0380125 A1 | 12/2014 | Calder et al. |
| 2014/0380126 A1 | 12/2014 | Yekhanin et al. |
| 2015/0006846 A1 | 1/2015 | Youngworth |
| 2015/0074065 A1 | 3/2015 | Christ et al. |
| 2015/0112951 A1 | 4/2015 | Narayanamurthy et al. |
| 2015/0134626 A1 | 5/2015 | Theimer et al. |
| 2015/0142863 A1 | 5/2015 | Yuen et al. |
| 2015/0160872 A1 | 6/2015 | Chen |
| 2015/0178007 A1 | 6/2015 | Moisa et al. |
| 2015/0186043 A1 | 7/2015 | Kesselman et al. |
| 2015/0254150 A1 | 9/2015 | Gordon et al. |
| 2015/0269025 A1 | 9/2015 | Krishnamurthy et al. |
| 2015/0303949 A1 | 10/2015 | Jafarkhani et al. |
| 2015/0331766 A1 | 11/2015 | Sarfare et al. |
| 2015/0370656 A1 | 12/2015 | Tsafrir et al. |
| 2015/0378542 A1 | 12/2015 | Saito et al. |
| 2016/0011935 A1 | 1/2016 | Luby |
| 2016/0011936 A1 | 1/2016 | Luby |
| 2016/0055054 A1 | 2/2016 | Patterson, III et al. |
| 2016/0085645 A1 | 3/2016 | Buzzard et al. |
| 2016/0162378 A1 | 6/2016 | Garlapati et al. |
| 2016/0169692 A1 | 6/2016 | Gupta |
| 2016/0170668 A1 | 6/2016 | Mehra |
| 2016/0217104 A1 | 7/2016 | Kamble et al. |
| 2016/0232055 A1 | 8/2016 | Vairavanathan et al. |
| 2016/0239384 A1 | 8/2016 | Slik |
| 2016/0253400 A1 | 9/2016 | McAlister et al. |
| 2016/0277497 A1 | 9/2016 | Bannister et al. |
| 2016/0292429 A1 | 9/2016 | Bannister et al. |
| 2016/0294419 A1 | 10/2016 | Sandell et al. |
| 2016/0328295 A1 | 11/2016 | Baptist et al. |
| 2016/0357443 A1 | 12/2016 | Li et al. |
| 2016/0357649 A1 | 12/2016 | Karrotu et al. |
| 2016/0371145 A1 | 12/2016 | \Kutsu et al. |
| 2016/0378624 A1 | 12/2016 | Jenkins, Jr. et al. |
| 2016/0380650 A1 | 12/2016 | Calder et al. |
| 2017/0003880 A1 | 1/2017 | Fisher et al. |
| 2017/0004044 A1 | 1/2017 | Tormasov et al. |
| 2017/0010944 A1 | 1/2017 | Saito et al. |
| 2017/0017671 A1 | 1/2017 | Baptist et al. |
| 2017/0031945 A1 | 2/2017 | Sarab et al. |
| 2017/0097875 A1 | 4/2017 | Jess et al. |
| 2017/0102993 A1 | 4/2017 | Hu et al. |
| 2017/0115903 A1 | 4/2017 | Franke et al. |
| 2017/0116088 A1 | 4/2017 | Anami et al. |
| 2017/0123914 A1 | 5/2017 | Li et al. |
| 2017/0153946 A1 | 6/2017 | Baptist et al. |
| 2017/0185331 A1 | 6/2017 | Gao et al. |
| 2017/0187398 A1 | 6/2017 | Trusov |
| 2017/0187766 A1 | 6/2017 | Zheng et al. |
| 2017/0206025 A1 | 7/2017 | Mswanathan |
| 2017/0206135 A1 | 7/2017 | Zeng |
| 2017/0212680 A1 | 7/2017 | Naghulde |
| 2017/0212845 A1 | 7/2017 | Conway |
| 2017/0220662 A1 | 8/2017 | Barton et al. |
| 2017/0235507 A1 | 8/2017 | Sinha et al. |
| 2017/0262187 A1 | 9/2017 | Manzanares et al. |
| 2017/0268900 A1 | 9/2017 | Nicolaas et al. |
| 2017/0272209 A1 | 9/2017 | Yanovsky et al. |
| 2017/0285952 A1 | 10/2017 | Danilov et al. |
| 2017/0286009 A1 | 10/2017 | Danilov et al. |
| 2017/0286436 A1 | 10/2017 | Neporada et al. |
| 2017/0286516 A1 | 10/2017 | Horowitz et al. |
| 2017/0288701 A1 | 10/2017 | Slik et al. |
| 2017/0344285 A1 | 11/2017 | Choi |
| 2018/0052744 A1 | 2/2018 | Chen et al. |
| 2018/0063213 A1 | 3/2018 | Bevilacqua-Linn et al. |
| 2018/0074753 A1 | 3/2018 | Ober |
| 2018/0074881 A1 | 3/2018 | Burden |
| 2018/0088857 A1 | 3/2018 | Gao et al. |
| 2018/0107415 A1 | 4/2018 | Motwani |
| 2018/0121286 A1 | 5/2018 | Sipos |
| 2018/0129417 A1 | 5/2018 | Sivasubramanian et al. |
| 2018/0129600 A1 | 5/2018 | Ishiyama et al. |
| 2018/0181324 A1 | 6/2018 | Danilov et al. |
| 2018/0181475 A1 | 6/2018 | Danilov et al. |
| 2018/0181612 A1 | 6/2018 | Danilov et al. |
| 2018/0217888 A1 | 8/2018 | Colgrove et al. |
| 2018/0246668 A1 | 8/2018 | Sakashita et al. |
| 2018/0267856 A1 | 9/2018 | Hayasaka et al. |
| 2018/0267985 A1 | 9/2018 | Badey et al. |
| 2018/0293017 A1 | 10/2018 | Curley et al. |
| 2018/0306600 A1 | 10/2018 | Nicolaas et al. |
| 2018/0307560 A1 | 10/2018 | Vishnumolakala et al. |
| 2018/0341662 A1 | 11/2018 | He |
| 2018/0375936 A1 | 12/2018 | Chirammal et al. |
| 2019/0028179 A1 | 1/2019 | Kalhan |
| 2019/0034084 A1 | 1/2019 | Nagarajan et al. |
| 2019/0043201 A1 | 2/2019 | Strong et al. |
| 2019/0043351 A1 | 2/2019 | Yang et al. |
| 2019/0050301 A1 | 2/2019 | Juniwal et al. |
| 2019/0065092 A1 | 2/2019 | Shah et al. |
| 2019/0065310 A1 | 2/2019 | Rozas |
| 2019/0102103 A1 | 4/2019 | Ari et al. |
| 2019/0114223 A1 | 4/2019 | Pydipaty et al. |
| 2019/0129644 A1 | 5/2019 | Gao et al. |
| 2019/0188079 A1 | 6/2019 | Kohli |
| 2019/0205437 A1 | 7/2019 | Larson et al. |
| 2019/0215017 A1 | 7/2019 | Danilov et al. |
| 2019/0220207 A1 | 7/2019 | Lingarajappa |
| 2019/0342418 A1 | 11/2019 | Eda et al. |
| 2019/0356416 A1 | 11/2019 | Yanovsky et al. |
| 2019/0384500 A1 | 12/2019 | Danilov et al. |
| 2019/0386683 A1 | 12/2019 | Danilov et al. |
| 2020/0004447 A1 | 1/2020 | Danilov et al. |
| 2020/0026810 A1 | 1/2020 | Subramaniam et al. |
| 2020/0034339 A1 | 1/2020 | Gershaneck et al. |
| 2020/0034471 A1 | 1/2020 | Danilov et al. |
| 2020/0042178 A1 | 2/2020 | Danilov et al. |
| 2020/0050510 A1 | 2/2020 | Chien et al. |
| 2020/0104377 A1 | 4/2020 | Earnesty, Jr. et al. |
| 2020/0117547 A1 | 4/2020 | Danilov et al. |
| 2020/0117556 A1 | 4/2020 | Zou et al. |
| 2020/0145511 A1 | 5/2020 | Gray et al. |
| 2020/0151353 A1 | 5/2020 | Struttmann |
| 2020/0204198 A1 | 6/2020 | Danilov et al. |
| 2021/0019067 A1 | 1/2021 | Miller et al. |
| 2021/0019093 A1 | 1/2021 | Karr et al. |
| 2021/0019237 A1 | 1/2021 | Karr et al. |
| 2021/0034268 A1* | 2/2021 | Hara .................... G06F 3/0631 |
| 2021/0096754 A1 | 4/2021 | Danilov et al. |
| 2021/0132851 A1 | 5/2021 | Danilov et al. |
| 2021/0133049 A1 | 5/2021 | Danilov et al. |
| 2021/0218420 A1 | 7/2021 | Danilov et al. |
| 2021/0255791 A1* | 8/2021 | Shimada ............... G06F 3/0607 |
| 2021/0273660 A1 | 9/2021 | Danilov et al. |

OTHER PUBLICATIONS

Notice of Allowance dated Jun. 27, 2022 for U.S. Appl. No. 16/584,800, 33 pages.

(56) References Cited

OTHER PUBLICATIONS

Office Action dated Jun. 17, 2022 for U.S. Appl. No. 16/986,222, 76 pages.
Office Action dated Jul. 14, 2022 for U.S. Appl. No. 17/153,602, 34 pages.
Office Action dated Jun. 1, 2022 for U.S. Appl. No. 16/538,984, 114 pages.
Notice of Allowance dated Jun. 8, 2022 for U.S. Appl. No. 16/179,486, 67 pages.
Non-Final Office Action received for U.S. Appl. No. 16/209,185 dated Jun. 18, 2020, 22 pages.
Martin Hosken, Developing a Hyper-Converged Storage Strategy for VMware vCloud Director with VMware vSAN, Jan. 2018 (Year: 2018).
Non-Final Office Action received for U.S. Appl. No. 16/261,549 dated Apr. 15, 2020, 22 pages.
Non-Final Office Action received for U.S. Appl. No. 16/374,726 dated Jun. 2, 2020, 47 pages.
Natarajan, RAID 0, RAID 1, RAID 5, RAID 10 Explained with Diagrams, Aug. 10, 2010, thegeekstuff.com (18 pages).
Non-Final Office Action received for U.S. Appl. No. 16/177,285 dated Jul. 22, 2020, 31 pages.
Non-Final Office Action received for U.S. Appl. No. 16/261,547 dated Sep. 3, 2020, 26 pages.
Non-Final Office Action received for U.S. Appl. No. 16/261,548 dated Aug. 21, 2020, 42 pages.
Notice of Allowance received for U.S. Appl. No. 16/261,549 dated Jul. 17, 2020, 40 pages.
Qiang et al., "Dynamics Process of Long-running Allocation/Collection in Linear Storage Space", International Conference on Networking, Architecture, and Storage (NAS 2007), Guilin, 2007, pp. 209-216.
Non-Final Office Action received for U.S. Appl. No. 16/374,725 dated Aug. 19, 2020, 50 pages.
Non-Final Office Action received for U.S. Appl. No. 16/511,161 dated Jul. 10, 2020, 24 pages.
Notice of Allowance received for U.S. Appl. No. 15/862,547 dated Mar. 29, 2019 27 pages.
Non-Final Office Action received for U.S. Appl. No. 15/792,714 dated Apr. 4, 2019, 20 pages.
Final Office Action received for U.S. Appl. No. 15/792,714 dated Sep. 12, 2019, 43 pages.
Wikipedia "Garbage Collection", URL: https://en.wikipedia.org/wiki/Garbage_collection_(computer science)#Availability (Year: 2017) retrieved using the WayBackMachine, Sep. 8, 2017, 8 pages.
Wikipedia "Erasure code", URL: https://web.archive.org/web/20170908171158/https://en.wikipedia.org/wiki/Erasure_code (Year: 2017), retrieved using the WayBackMachine, Sep. 8, 2017, 5 pages.
Wikipedia "Front and back ends" URL: https://en.wikipedia.org/wiki/Front_and_back_ends (Year:2019), Sep. 6, 2019, 4 pages.
Notice of Allowance received for U.S. Appl. No. 15/792,714 dated Nov. 8, 2019, 31 pages.
Non-Final Office Action received for U.S. Appl. No. 15/791,390 dated Sep. 20, 2019, 27 pages.
Final Office Action received for U.S. Appl. No. 15/791,390 dated Feb. 6, 2020, 29 pages.
Non-Final Office Action received for U.S. Appl. No. 15/791,390 dated Apr. 30, 2020, 48 pages.
Huang et al., "Scale-RS: An Efficient Scaling Scheme for RS-Coded Storage Clusters," in IEEE Transactions on Parallel and Distributed Systems, vol. 26, No. 6, pp. 1704-1717, Jun. 1, 2015.
Non-Final Office Action received for U.S. Appl. No. 16/457,615 dated Jul. 20, 2020, 34 pages.
Non-Final Office Action received for U.S. Appl. No. 15/651,504 dated Mar. 21, 2019, 10 pages.
Non-Final Office Action received for U.S. Appl. No. 15/662,273 dated Nov. 16, 2018, 19 pages.
Final Office Action received for U.S. Appl. No. 15/662,273 dated May 15, 2019, 33 pages.
Non-Final Office Action received for U.S. Appl. No. 15/965,479 dated Apr. 15, 2019, 21 pages.
Non-Final Office Action received for U.S. Appl. No. 15/794,950 dated Jul. 9, 2019, 29 pages.
Final Office Action received for U.S. Appl. No. 15/651,504 dated Sep. 18, 2019, 15 pages.
Non-Final Office Action received for U.S. Appl. No. 15/952,179 dated Sep. 10, 2019, 42 pages.
Wikipedia, "Standard Raid Levels—RAID 6", URL: https://en.wikipedia.org/wiki/Standard_RAID_levels#RAID_6, Oct. 18, 2019, 11 pages.
Non-Final Office Action received for U.S. Appl. No. 15/656,382 dated Nov. 1, 2019, 47 pages.
Final Office Action received for U.S. Appl. No. 15/952,179 dated Nov. 26, 2019, 53 pages.
Non Final Office Action received for U.S. Appl. No. 16/024,314 dated Nov. 25, 2019, 42 pages.
Non-Final Office Action received for U.S. Appl. No. 16/177,278 dated Dec. 2, 2019, 55 pages.
Non-Final Office Action received for U.S. Appl. No. 15/651,504 dated Dec. 31, 2019, 18 pages.
Non-Final Office Action received for U.S. Appl. No. 16/010,246 dated Dec. 5, 2019, 67 pages.
Stonebreaker et al. "Distributed RAID—A New Multiple Copy Algorithm.", IEEE ICDE, 1990, pp. 430-437.
Muralidhar et al. "f4: Facebook's Warm BLOB Storage System", USENIX. OSDI, Oct. 2014, pp. 383-398.
Final Office Action dated Feb. 12, 2020 for U.S. Appl. No. 16/024,314, 29 pages.
Non-Final Office Action received for U.S. Appl. No. 16/010,255 dated Jan. 9, 2020, 31 pages.
Office Action dated Feb. 5, 2020 for U.S. Appl. No. 16/261,551, 30 pages.
Non-Final Office Action received for U.S. Appl. No. 16/228,612 dated Feb. 27, 2020, 49 pages.
Final Office Action received for U.S. Appl. No. 16/010,246 dated Mar. 16, 2020, 33 pages.
Final Office Action received for U.S. Appl. No. 15/656,382 dated Apr. 6, 2020, 31 pages.
Non-Final Office Action received for U.S. Appl. No. 15/582,167 dated Sep. 7, 2018, 19 pages.
Non-Final Office Action received for U.S. Appl. No. 15/952,179 dated Apr. 20, 2020, 68 pages.
Notice of Allowance received for U.S. Appl. No. 16/240,193, dated May 4, 2020, 46 pages.
Final Office Action received for U.S. Appl. No. 16/177,278, dated May 11, 2020, 53 pages.
Non-Final Office Action received for U.S. Appl. No. 16/231,018 dated May 8, 2020, 78 pages.
Notice of Allowance dated May 11, 2020 for U.S. Appl. No. 16/240,193, 24 pages.
Non-Final Office Action received for U.S. Appl. No. 16/228,624 dated Jun. 24, 2020, 65 pages.
Non-Final Office Action received for U.S. Appl. No. 16/240,272 dated Jun. 29, 2020, 64 pages.
Non-Final Office Action received for U.S. Appl. No. 16/228,612 dated Jun. 29, 2020, 62 pages.
Final Office Action received for U.S. Appl. No. 16/010,255 dated Jul. 23, 2020, 36 pages.
Office Action received for U.S. Appl. No. 16/010,246 dated Jul. 27, 2020 36 pages.
Office Action received for U.S. Appl. No. 16/177,278, dated Aug. 21, 2020, 53 pages.
Office Action received for U.S. Appl. No. 16/179,486, dated Aug. 13, 2020, 64 pages.
Guo et al., "GeoScale: Providing Geo-Elasticity in Distributed Clouds" 2016 IEEE International Conference on Cloud Engineering, 4 pages.
Guo et al., "Providing Geo-Elasticity in Geographically Distributed Clouds". ACM Transactions on Internet Technology, vol. 18, No. 3, Article 38. Apr. 2018. 27 pages.
Office Action received for U.S. Appl. No. 16/254,073, dated Aug. 18, 2020, 62 pages.

(56) References Cited

OTHER PUBLICATIONS

Non-Final Office Action received for U.S. Appl. No. 16/526,142 dated Oct. 15, 2020, 21 pages.
Notice of Allowance received U.S. Appl. No. 16/228,612 dated Oct. 20, 2020, 84 pages.
Zhou, et al. "Fast Erasure Coding for Data Storage: A Comprehensive Study of the Acceleration Techniques" Proceedings of the 17th Usenix Conference on File and Storage Technologies (FAST '19), [https://www.usenix.org/conference/fast19/presentation/zhou], Feb. 2019, Boston, MA, USA. 14 pages.
Non-Final Office Action received for U.S. Appl. No. 16/010,255 dated Oct. 29, 2020, 65 pages.
Final Office Action received for U.S. Appl. No. 16/240,272 dated Oct. 27, 2020, 42 pages.
Non-Final Office Action received for U.S. Appl. No. 16/399,902 dated Oct. 28, 2020, 83 pages.
Notice of Allowance received for U.S. Appl. No. 16/374,726 dated Nov. 20, 2020, 78 pages.
Final Office Action received for U.S. Appl. No. 16/228,624 dated Dec. 1, 2020, 63 pages.
Non-Final Office Action received for U.S. Appl. No. 16/570,657 dated Nov. 27, 2020, 75 pages.
Final Office Action received for U.S. Appl. No. 16/177,285 dated Dec. 30, 2020, 61 pages.
Final Office Action received for U.S. Appl. No. 16/511,161 dated Dec. 30, 2020, 61 pages.
Non-Final Office Action received for U.S. Appl. No. 16/399,895 dated Jan. 4, 2021, 64 pages.
Notice of Allowance received for U.S. Appl. No. 16/374,726 dated Jan. 6, 2021, 56 pages.
Non-Final Office Action received for U.S. Appl. No. 16/399,897 dated Feb. 19, 2021, 56 pages.
Non-Final Office Action received for U.S. Appl. No. 16/670,715 dated Mar. 31, 2021, 60 pages.
Final Office Action received for U.S. Appl. No. 16/177,278 dated Feb. 24, 2021, 109 pages.
Dell, "EMC ECS (Elastic Cloud Storage) Architectural Guide v2.x", URL : https://www.dell.com/community/s/vjauj58549/attachments/vjauj58549/solutions-ch/477/1/h14071-ecs-architectural-guide-wp.pdf, H14071.1, Jun. 2015, pp. 1-21.
Mohan et al., "Geo-aware erasure coding for high-performance erasure-coded storage clusters", Annals of Telecommunications, vol. 73, Springer, Jan. 18, 2018, pp. 139-152.
Final Office Action received for U.S. Appl. No. 16/179,486 dated Jan. 28, 2021, 55 pages.
Non-Final Office Action received for U.S. Appl. No. 16/670,746 dated Feb. 16, 2021, 55 pages.
Jarvis, Zhu, "ECS Overview and Architecture", Dell Technologies, h14071.18, Feb. 2021, pp. 1-55.
EMC; "EMC ECS (Elastic Cloud Storage) Architectural Guide v2.x", URL : https://www.dell.corn/community/s/vjauj58549/attachments/vjauj58549/solutions-ch/477 /1/h14071-ecs-architectural-guide-wp.pdf,Jun. 2015, 21 pages.
Non-Final Office Action received for U.S. Appl. No. 16/177,285 dated Apr. 9, 2021, 41 pages.
Non-Final Office Action received for U.S. Appl. No. 16/779,208 dated Apr. 20, 2021, 71 pages.
Notice of Allowance received for U.S. Appl. No. 16/726,428 dated Jun. 14, 2021, 34 pages.
Non-Final Office Action received for U.S. Appl. No. 16/698,096 dated May 24, 2021, 62 pages.
Non-Final Office Action received for U.S. Appl. No. 16/745,855 dated May 13, 2021, 71 pages.
Non-Final Office Action received for U.S. Appl. No. 16/834,649 dated Jun. 24, 2021, 61 pages.
Non-Final Office Action received for U.S. Appl. No. 16/179,486 dated May 12, 2021, 50 pages.
Non-Final Office Action received for U.S. Appl. No. 16/570,657 dated May 12, 2021, 79 pages.
Non-Final Office Action received for U.S. Appl. No. 16/670,765 dated Jul. 20, 2021, 79 pages.
Thomasian et al., "Hierarchical RAID: Design, performance, reliability, and recovery", J. Parallel Distrib. Comput. vol. 72 (2012) pp. 1753-1769.
Notice of Allowance received for U.S. Appl. No. 16/570,657 dated Sep. 7, 2021, 65 pages.
Ma et al., "An Ensemble of Replication and Erasure Codes for Cloud File Systems", Proceedings—IEEE INFOCOM, Apr. 2013, pp. 1276-1284.
Final Office Action received for U.S. Appl. No. 16/698,096 dated Sep. 7, 2021, 24 pages.
Final Office Action received for U.S. Appl. No. 16/177,285 dated Sep. 14, 2021, 65 pages.
Final Office Action received for U.S. Appl. No. 16/670,715 dated Sep. 7, 2021, 35 pages.
Final Office Action received for U.S. Appl. No. 16/179,486 dated Oct. 20, 2021, 46 pages.
Notice of Allowance received for U.S. Appl. No. 16/745,855 dated Sep. 10, 2021, 37 pages.
Non-Final Office Action received for U.S. Appl. No. 16/526,182 dated Nov. 24, 2021, 83 pages.
Notice of Allowance received for U.S. Appl. No. 16/888,144 dated Nov. 22, 2021, 71 pages.
Non-Final Office Action received for U.S. Appl. No. 16/698,096 dated Jan. 5, 2022, 21 pages.
Non-Final Office Action received for U.S. Appl. No. 16/670,715 dated Jan. 5, 2022, 22 pages.
Office Action dated Apr. 13, 2021 for U.S. Appl. No. 16/781,316, 21 pages.
Office Action dated Nov. 24, 2021 for U.S. Appl. No. 16/538,984, 30 pages.
Non-Final Office Action received for U.S. Appl. No. 16/834,649 dated Jan. 28, 2022, 26 pages.
Office Action dated Feb. 8, 2022 for U.S. Appl. No. 16/986,222, 62 pages.
Non-Final Office Action received for U.S. Appl. No. 16/584,800 dated Mar. 3, 2022, 90 pages.
Non-Final Office Action received for U.S. Appl. No. 16/403,417 dated Feb. 25, 2022, 100 pages.
Non-Final Office Action received for U.S. Appl. No. 17/153,602 dated Mar. 16, 2022, 40 pages.
Notice of Allowance received for U.S. Appl. No. 17/333,793 dated Mar. 9, 2022, 39 pages.
Sun et al., "Data Management across Geographically-Distributed Autonomous Systems: Architecture, Implementation, and Performance Evaluation," IEEE Transactions on Industrial Informatics, 2019, 9 pages.
Notice of Allowance dated May 16, 2022 for U.S. Appl. No. 16/526,182, 54 pages.

* cited by examiner

EFFICIENT DATA ACCESS OPERATIONS VIA A MAPPING LAYER INSTANCE FOR A DOUBLY MAPPED REDUNDANT ARRAY OF INDEPENDENT NODES

BACKGROUND

Conventional data storage techniques can store data in one or more arrays of data storage devices. An example system can comprise data storage devices, e.g., disks, etc., arranged in nodes, wherein nodes can be comprised in a first storage cluster. One use of data storage is in bulk data storage. Data can conventionally be stored in a group of nodes format for a given cluster, for example, all disks of nodes comprising the group of nodes can conventionally be considered part of the group of nodes. As such, a node with many disks can, in some conventional embodiments, comprise a large amount of storage that can go underutilized. As an example, a storage group of five nodes, with ten disks per node, at 8 terabytes (TBs) per disk can be about 400 TB in size. This can be excessively large for some types of data storage, however apportioning smaller groups, e.g., fewer nodes, less disks, smaller disks, etc., can be inefficient in regards to processor and network resources, e.g., computer resource usage, to support these smaller groups. As such, it can be desirable to have more granular logical storage groups that can employ portions of larger real groups, thereby facilitating efficient computer resource usage, e.g., via larger real groups, but still providing smaller logical groups that can be used more optimally for storing smaller amounts of data therein.

DETAILED DESCRIPTION

Figure 1:
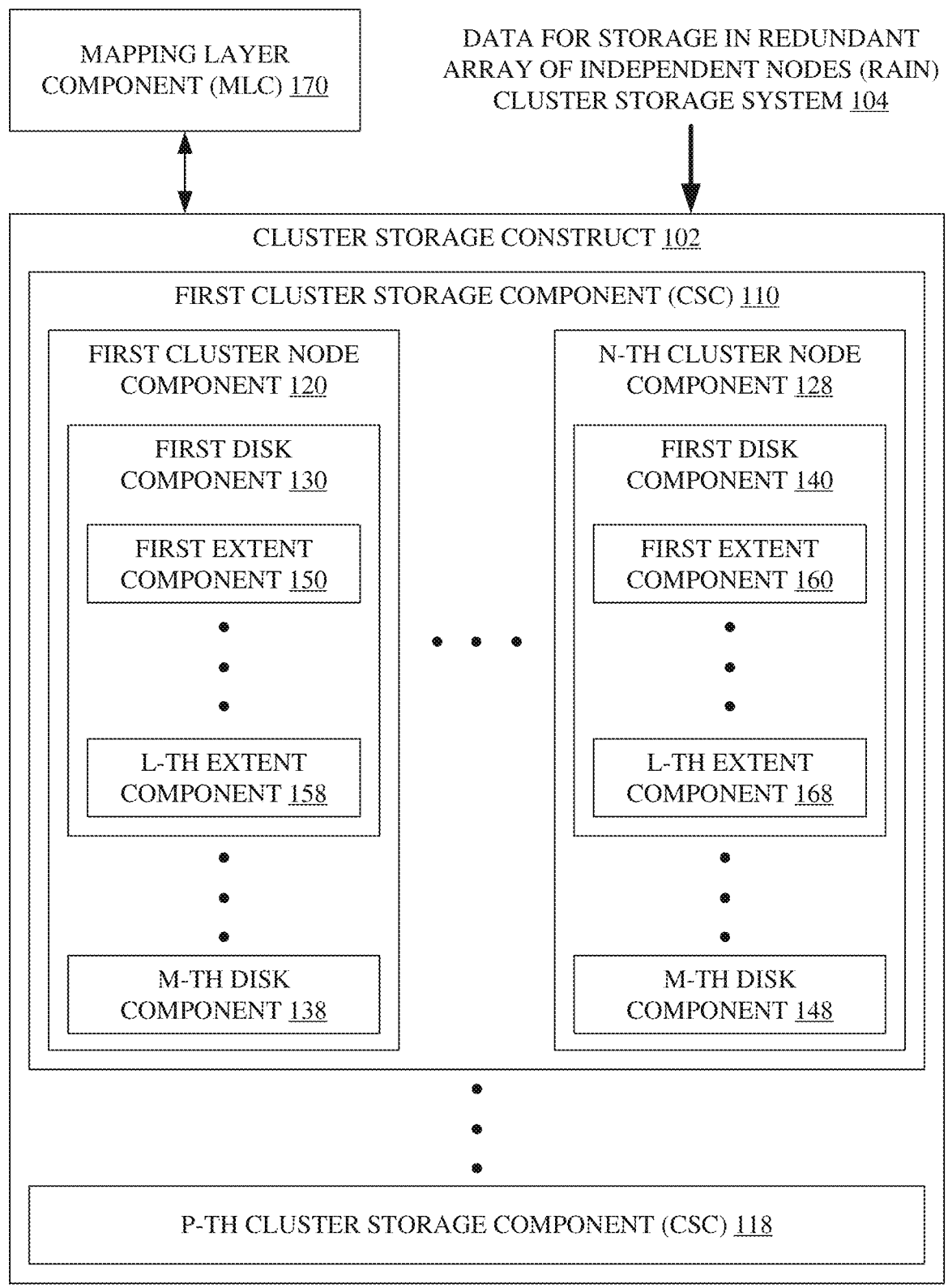
FIG. 1 is an illustration of an example embodiment that can facilitate controlling input and output operations of a doubly mapped redundant array of independent nodes (RAIN) storage system, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As mentioned, data storage techniques can conventionally store data in one or more arrays of data storage devices, hereinafter a cluster, real cluster, cluster storage construct, etc. The term 'real' is intended to convey that the component is physical, as compared to a 'mapped' component that is a logical component, e.g., a 'real' disk can be a physical disk as compared to a mapped disk that can be an abstraction or logical arrangement that can be embodied on physical storage elements. As such, the convention of real and mapped components in the instant disclosure can also be regarded as correspondingly referring to physical and logical components. Data can be stored in via a system can comprise data storage devices, e.g., disks, etc., arranged in nodes, wherein nodes can be comprised in a real cluster. Data storage via the real cluster can be arranged according to a logic embodied in a mapped cluster topography. A data storage device can comprise one or more extent, wherein the sum of the extents of a data storage device represents the storage capacity of the data storage device, e.g., a 128 MB disk can comprise 128 extents, wherein each of the 128 extents can store approximately 1 MB of data. One use of data storage is in bulk data storage. Data can conventionally be stored in a group of nodes format for a given cluster. As such, a node with many disks can, in some conventional embodiments, comprise a large amount of storage that can go underutilized. As such, it can be desirable to have more granular logical storage groups that can employ portions of larger real groups, thereby facilitating efficient computer resource usage, e.g., via larger real groups, but still providing smaller logical groups comprised of extents that can be used more efficiently for storing smaller amounts of data therein.

Figure 10:
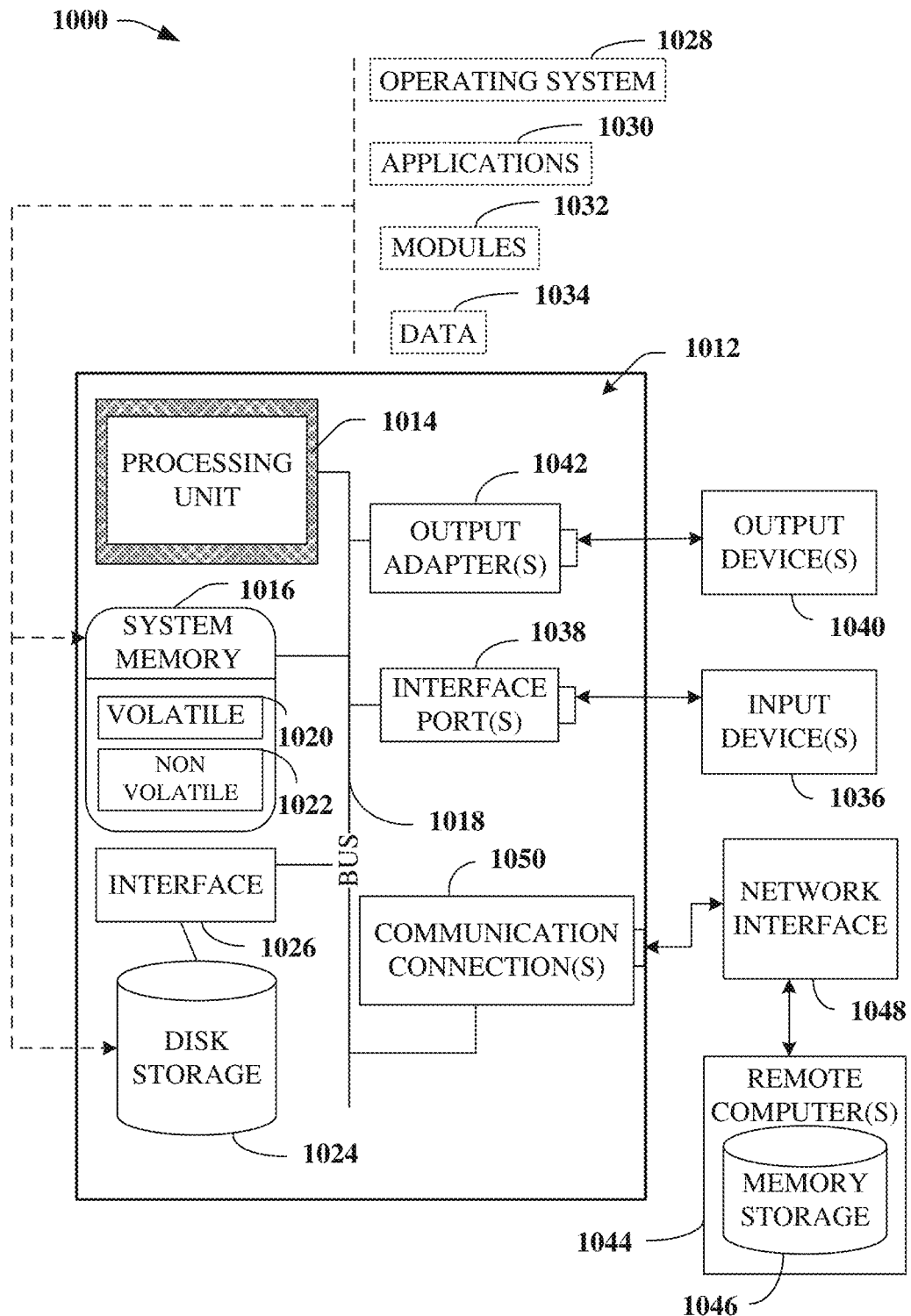
FIG. 10 illustrates an example block diagram of a computing system operable to execute the disclosed systems and methods in accordance with an embodiment.

A real cluster(s) can comprise real nodes, and the real nodes can comprise real data storage devices, which in turn can comprise extents, e.g., real extents of real disks of real nodes. Interaction with, management of, etc., the extents selected to store according to a mapped node topography, e.g., via a mapped extent of a mapped disk of a mapped node of a mapped cluster, can employ computing resources, e.g., a processor(s), memory(ies), network interface(s), user interface(s), etc., such as are illustrated at FIG. 10, etc. A real node can be a discrete hardware node that comprises real storage devices, for example a real node can comprise a rack mounted controller interacting with M hard disks, for example, in a rack that can be separate from another real node that can comprise a second rank mounted controller and other real storage devices. The storage devices of these nodes can be divided into extents to enable more granular use of memory than would be experienced by employing entire storage devices, e.g., a storage device can be divided into L extents, etc., that can be utilized at a finer granularity than the sum of the L extents. In an embodiment, a real node can execute operations related to control of the real node, for example, managing data storage space provided via some of the L extents of the example M hard disks, of N real nodes of a real cluster, etc. Further, a real node can execute an instance of a mapped cluster storage service (MCSS) that can enable the virtualization of real storage space into doubly mapped clusters that can span real extents of real nodes of a real cluster(s), e.g., interaction between MCSS instances executing on different real node computing resources can enable data interaction via a mapped cluster comprising mapped nodes comprising mapped disks that store data via real extents of real disks of real nodes of real clusters. Generally, a singly mapped cluster maps to real disks while a doubly mapped cluster maps to real extents of real disks, e.g., the doubly mapped cluster generally can have finer granularity than a singly mapped cluster.

In an embodiment of the presently disclosed subject matter, a doubly mapped redundant array of independent nodes, hereinafter a doubly mapped RAIN, can comprise a doubly mapped cluster, wherein the doubly mapped cluster can comprise a logical arrangement of storage locations of real extents of real storage devices. A real cluster(s), e.g., a group of real storage devices comprised in one or more hardware nodes that can be comprised in one or more clusters, can be allocated so as to allow more granular use of the real cluster in contrast to conventional storage techniques, e.g., doubly mapped clusters can be built atop a real cluster to allow the real cluster to be used with finer granularity. As an example, in conventional techniques, multiple real nodes of a real cluster can be dedicated for use by a customer, while in contrast, multiple doubly mapped nodes can be dedicated for use by the customer where each doubly mapped node can map to a portion of a real disk of a real node, thereby enabling the customer to use only a portion of the corresponding multiple real nodes, e.g., a more granular use of the real node storage space. As an aside, in some example embodiments, a doubly mapped cluster can comprise doubly mapped nodes that can provide data redundancy that can allow for failure of a portion of one or more doubly mapped nodes of the doubly mapped cluster without loss of access to stored data, can allow for removal/addition of one or more nodes from/to the doubly mapped cluster without loss of access to stored data, etc. As an example, a doubly mapped cluster can comprise doubly mapped nodes having a data redundancy scheme analogous to a redundant array of independent disks (RAID) type-6, e.g., RAID6, also known as double-parity RAID, etc., wherein employing a doubly mapped node topology and two parity stripes on each doubly mapped node can allow for two doubly mapped node failures before any data of the doubly mapped cluster can become less accessible, etc. In other example embodiments, a doubly mapped cluster can employ other doubly mapped node topologies and parity techniques to provide data redundancy, e.g., analogous to RAID0, RAID1, RAID2, RAID3, RAID4, RAID5, RAID6, RAID0+ 1, RAID1+0, etc., wherein a doubly mapped node of a doubly mapped cluster can comprise one or more doubly mapped disks, and the doubly mapped node can be loosely similar to a disk in a RAID system. Unlike RAID technology, an example doubly mapped RAIN system can provide access to more granular storage in, for example, very large data storage systems that can often on the order of terabytes, petabytes, exabytes, zettabytes, or even larger, because each doubly mapped node can generally comprise a plurality of doubly mapped disks, unlike RAID technologies.

In an embodiment, software, firmware, etc., can hide an abstraction of doubly mapping nodes in a doubly mapped RAIN system, e.g., a group of doubly mapped nodes can appear to be a contiguous block of data storage even where, for example, it can be embodied via multiple extents of one or more real disks, multiple real groups of hardware nodes, multiple real clusters of hardware nodes, multiple geographic locations, etc. For a given real cluster, e.g., real RAIN, that is N real nodes wide, M real disks deep, and L real extents high, a doubly mapped cluster, e.g., a doubly mapped RAIN, can consist of up to N' mapped nodes that each manage up to M' mapped disks employing as many as M'×L' real extents, e.g., a doubly mapped RAIN can store data on up to N×M×L extents of a real cluster, although it can be common that the real cluster can support multiple doubly mapped RAINs that can each use fewer than the total number of extents of the real cluster wherein the sum of the participating extents supporting all of the multiple doubly mapped RAINs does not exceed the total number of extents of the real cluster. Accordingly, in an embodiment, one example doubly mapped node of size X can comprise mapped disks corresponding to one or more real extents of one or more real disks of one or more real nodes of one or more real clusters, wherein the size of available storage space of the one or more real clusters is greater than or equal to X. Similarly, in an embodiment, extents of one or more real disks of one real nodes of one or more real clusters can be readily be managed by mapped nodes of one or more doubly mapped clusters.

In some embodiments, one or more rules can be employed in allocating a doubly mapped cluster to enable selected cluster design characteristics. As an example, according to an example data loss protection rule, etc., generation of a doubly mapped cluster can be prohibited where the resulting doubly mapped cluster is determined to employ two extents of one real disk in different mapped disks of one doubly mapped RAIN, e.g., this can protect against loss of one real disk from affecting two mapped disks of a doubly mapped RAIN. In this example, where a first mapped disk can store data and a second mapped disk can store protection data for the stored data of the first mapped disk, then loss of both the first and second mapped disk can result in a data loss event and, accordingly, it can be a best practice to prohibit doubly mapped clusters that risk this type of data loss exposure via employing two extents of one real disk in different mapped disks of one doubly mapped RAIN. As another example, according to another data loss protection rule, etc., a doubly mapped cluster can be prohibited where it would employ two real disks of one real node in different mapped nodes of one doubly mapped RAIN, e.g., this can protect against loss of one real node from affecting two mapped disks of a doubly mapped RAIN. In this example, where a first mapped disk can store data and a second mapped disk can store protection data for the stored data of the first mapped disk, then loss of both the first and second mapped disk can result in a data loss event and, accordingly, it can be a best practice to prohibit doubly mapped clusters that risk this type of data loss exposure via employing two real disks of one real node in different mapped disks of one doubly mapped RAIN. In other embodiments, a data loss protection rule can correspond to other mapped cluster schema to offer protection against the loss of more or less mapped nodes, e.g., in some embodiments where the mapped cluster redundancy is designed to withstand a loss of two mapped nodes, the related data loss protection rule can allow for one real node to support mapped disks from two mapped nodes of the same mapped cluster. It is noted that all such data loss protection rules are considered within the scope of the present disclosure even where not explicitly recited for the sake of clarity and brevity.

Whereas an extent of a real disk can be comprised in a real node that can be comprised in a real cluster, and, whereas an extent of a real disk can correspond to a portion of a doubly mapped disk, a doubly mapped disk can then comprise one or more extents of one or more real disks, a doubly mapped node can comprise one or more extents of one or more real nodes, a doubly mapped cluster can comprise one or more extents of one or more real clusters, etc., and, for convenience, the terms 'doubly' and 'RAIN' can be omitted for brevity, e.g., a doubly mapped RAIN cluster can be referred to simply as a mapped cluster, a doubly mapped RAIN node can simply be referred to as a mapped node, etc., wherein 'mapped' is intended to convey that the doubly mapped node is an abstraction of a portion of real storage space that can be distinct from an entire real disk, an entire real node, etc., and corresponding real physical hardware component(s) and/or computing resource(s) of the real disk/node/cluster/ etc., e.g., while data is actually stored on a real cluster/node/disk/extent, the data storage can abstracted to appear as being stored in a doubly mapped cluster/node/disk such that one or more doubly mapped cluster/node/disk can be 'built on top' of a real cluster/node/disk/extent. As an example, a data storage customer can use a doubly mapped cluster for data storage whereby the stored data is actually stored in various real extents of various data storage locations of a real data storage system, e.g., a real cluster, etc., according to a logical mapping between the real cluster and the doubly mapped cluster. This example can enable the doubly mapped cluster to have more granular data storage than in conventional allocation of storage space from real clusters.

In an embodiment, storage of data via a mapped cluster can be via a real cluster, e.g., the mapped cluster can be of size N' mapped nodes by M' mapped disks each comprising up to L' mapped extents, and the real cluster can be N real nodes by M real disks comprising up to L extents per real disk in size, where N'=N, M'=M, and L'=L. In other embodiments, N' can be less than, or equal to, N, M' can be less than, or equal to, M, and/or L' can be less than, or equal to, L. It will be noted that in some embodiments, M' can be larger than M, e.g., where the mapping of a M real disks into M' mapped disks portions comprises use of a part of one of the M disks, for example, 10 real disks (M=10) can be mapped to 17 mapped disk portions (M'=17), can be mapped to 11 mapped disk portions (M'=11), can be mapped to 119 mapped disk portions (M'=119), etc. It will be further noted that in some embodiments, L' can be larger than L, e.g., where a mapped disk comprises L(1)'+L(2)' . . . +L(M)' extents, for example, extents of two mapped nodes (N=2), each of 10 real disks (M=10), wherein each real disk comprises 12 extents (L=12), for a total of 240 real extents, can be mapped to an example mapped cluster having a mapped disk comprised of 18 real extents, e.g., one extent from each of nine real disks of the first real node and each of nine real disks of the second real node; ten extents of one real disk of the first real node and nine extents of another real disk of the second real node; ten extents of one real disk of the first real node and one extent of each of nine real disks of the second real node; etc. Numerous other permutations are possible in assigning extents of real disks to support mapped disks/nodes/clusters and all such permutations, combinations, etc., are within the scope of the subject disclosure even where not explicitly recited for the sake of clarity and brevity.

In some embodiments, the mapped cluster can be smaller than the real cluster. Moreover, where the mapped cluster is sufficiently small in comparison to the real cluster, the real cluster can accommodate one or more additional mapped clusters. As an example, where the real cluster is 8×8×8, e.g., 8 real nodes by 8 real disks by 8 extents per real disk, then, for example, four mapped 4×4×8 clusters can be provided, wherein each of the four mapped 4×4×8 clusters is approximately ¼th the size of the real cluster. As a second example, given an 8×8×8 real cluster 64 mapped 2×2×2 clusters can be provided where each mapped cluster is approximately ¹⁄₆₄th the size of the real cluster. As a third example, for the 8×8×2 real cluster, 2 mapped 4×8×2 or 8×4×2 clusters can be provided and each can be approximately ½ the size of the real cluster. Additionally, the example 8×8×8 or 8×8×2 real cluster can provide a mix of different sized mapped clusters, for example one 8×4×8 mapped cluster, one 4×4×8 mapped cluster, and four 2×2×8 mapped clusters; etc. In some embodiments, not all of the real cluster must be comprised in one or more mapped cluster(s), e.g., an example 8×8×8 real cluster can comprise only one 2×4×2 mapped cluster with the rest of the real cluster not (yet) being allocated into mapped storage space. Further, L for each of the M disks ban be, but need not be, the same value, e.g., real disk 1 can be 10 extents, e.g., L(1)=10, real disk 2 can be 12 extents, e.g., L(2)=12, real disk 3 can be 10 extents, e.g., L(3)=10, real disk 4 can be 1 extent, e.g., L(4)=1, etc. Moreover, the different disks can be the same or different size, e.g., disk 1 can be 128 megabytes (MB), disk 2 can be 512 MB, disk 3 can be 1 terabyte (TB), etc. Similarly, different real nodes can be of the same or different sizes.

A doubly mapped RAIN can, in some embodiments, be abstracted via execution of operations via a processor, a virtual processor executing on a real processor, a combination of real processors and virtual processors, etc., that can enable interaction with data "stored in a doubly mapped cluster," e.g., a data representation corresponding to real data stored on one or more real clusters. The data stored in a doubly mapped cluster can actually correspond to real data stored on an extent of extents of a disk of a node of a real cluster, but can be interacted with according to a logical relation, e.g., to a representation said to be 'stored in the doubly mapped cluster.' As such, writing data into a logical address of the doubly mapped cluster can result in writing of the data into a physical data storage element addressed in the real cluster and an association between the doubly mapped cluster address and the real cluster address can be retained to allow other operations with the data, e.g., via operations directed to the logical representation but performed on the real data. In an embodiment, the retention of the real-to-mapped address relationship, e.g., doubly mapped data corresponding to the real data, etc., can be via nearly any technique, for example, via a mapping table, via a data structure, etc., and all such techniques are within the scope of the present disclosure. In an embodiment, the relationships between physical and logical data locations can be embodied in a mapping layer that can be comprised in a mapping service employed by a cluster storage system. A mapping layer component (MLC) can therefore enable access to information reflecting a relationship between a physical storage location and a logical storage location, such as via a mapping layer component instance, etc. In an example, a mapping service can comprise mapping information, e.g., relationship information corresponding to real and mapped data storage, and a real node can perform an MLC instance that can access at least a portion of the mapping information, for example, mapping information corresponding to data for different mapped nodes storing data via extents of the real node, etc. Moreover, the relationship information can typically be updatable, for example, allowing movement of data at the real cluster to still relate to an unchanged doubly mapped address, allowing movement of the doubly mapped data to still relate to unmoved data at the real address, etc. As an example, where a node of a real cluster fails, the relationship to the doubly mapped address can be updated to associate a redundant duplicate of the data of the real cluster to be associated with the doubly mapped address, thereby allowing a user of the doubly mapped cluster to operate on the data without disturbance. As another example, moving data in a doubly mapped cluster environment can be decoupled from actually moving the data within the real cluster, e.g., the updated doubly mapped address can be affiliated with the unchanged real address, etc. As a further example, a failure of a doubly mapped node, which is not related to a failure of a real node, can be compensated for by providing access to the real data at the unhanged real cluster address via a redundant doubly mapped cluster node. The above example updated relationship information can then be readily accessed via an MLC instance, etc. Numerous other examples of doubly mapped RAIN technology are readily appreciable and are considered within the scope of the present disclosure even where not recited for clarity and brevity.

In some embodiments of cluster-based storage systems, a disk can be associated with a first cluster node and that first node can hold exclusive access to the disk. As such, in these embodiments, if a second cluster node seeks to access, e.g., an input/output operation (I/O operation) to the disk, a storage service of the second node can be required to perform the I/O operation via a storage service of the first node. In these types of embodiments, storage services of a first mapped node can then be observed to use storage services of a second mapped node to access a mapped disk. This can lead to some inefficiencies. As an example, if an extent is comprised in a first real node and the first extent is mapped to a mapped disk supported by a mapped node employing a storage service implemented on a second real node, then for an I/O operation originating from the first node to the mapped disk, data is communicated to the second real node to allow the storage service to facilitate the I/O operation on 'the mapped node of the second real node' even though it is mapped back to an extent of the first real node, resulting in further communicating the data back to the first real node to perform the I/O operations, e.g., the data undergoes at least two hops between real nodes to be performed due to the 'exclusive access' feature of some storage service embodiments. In contrast, as is disclosed further herein, by allocating I/O operations based on mapping determined via an MLC instance, etc., at an I/O operation originating real node, these double hops can be reduced. Returning to the above example, the first node can check with a local MLC instance to determine that the first node comprises the extent to which the second real node maps the data to be interacted with, e.g., via the I/O operation. The first node can then directly perform the I/O operation on the data stored at the local extent without needing to communicate the data to the second real node and then back again. Moreover, the first real node in this example, can inform the second real node of the I/O operation such that the second real node can perform any updates corresponding to the I/O operation performed 'on behalf of the second real node' by the first real node at the extent of the first real node. This example well illustrates an improvement in the operation of the data storage system by reducing how much data is communicated.

Generally, an instance of a storage service can enable interaction with data stored via a mapped disk of a mapped node, e.g., writing, reading, modifying, moving, copying, duplicating, deleting, freeing, etc., of data in a mapped cluster abstraction can be performed on data of a real extent of a real disk of a real node of a real cluster via an instance of a storage service. In an embodiment, an instance of a storage service, herein after simply a 'storage service' for clarity and brevity, can execute on a component of a real cluster storage system, on a component communicatively coupled to a real cluster storage system, etc. In some embodiments, the storage service can execute in a dedicated component, for example a mapped cluster control component, e.g., 220, etc., that can be local to, or located remotely from, a real disk of a real cluster. In some embodiments, the storage service can execute on a component of a real node, e.g., on a computing resource of a hardware node, etc., comprised in the real cluster. As an example, an example real cluster can be comprised of eight real nodes in a data center, wherein each real node comprises M real disks, wherein each real node comprises computing resources, and wherein the computing resources can support execution of one or more instances of storage services to enable building a mapped cluster on top of the real cluster. It can be appreciated that executing a storage service on the 8th real node of the cluster to support a mapped node of the mapped cluster storing some amount of data via real disks of the 1st real node, e.g., the mapped node maps to extents of the 1st real node, can entail interaction between the computing resources of the 1st and 8th real node. Where all or more of a mapped node's data is stored on a first real node, it can therefore typically be a best practice to perform a storage service on the same first real node to reduce data communication demands. In the example, interactions can be an extraneous burden on computing resources in comparison to performing the storage service on the 1st real node where the storage service can more directly support the data stored on the extents of the 1st real node without the extra communications to the 8th real node previously noted. Accordingly, it can be desirable to instantiate storage service instances based on a mapping of mapped clusters to extents of real clusters, wherein extents of real clusters indicates extents of disks of nodes of the example real cluster.

In some embodiments, a performance of computing resources can act as a further metric to the selective instantiation of a storage service. Returning to the previous example, where the 1st real node computing resources are, for example, determined to be inappropriate for executing the instance of the storage service, it can be desirable to then instantiate the storage service on another real node, for example the 8th real node, even though the data is stored via the extents of the 1st real node. The analysis of computing resources of a real node can indicate a level performance that can be employed in determining if that real node is appropriate to execute a storage service waiting to be assigned. In an iteration of the previous example, the 1st real node can comprise fewer and older processors than the 8th real node, which can be used to determine that executing the storage service on the 1st real node can have lower performance than execution on the 8th real node even where there is additional computing resource overhead in signaling between the 1st and 8th real nodes. In another iteration of the previous example, the 1st real node can already be executing other instances of storage services, e.g., for other mapped nodes, etc., and it can be determined that executing a further storage service would degrade performance sufficiently that it then becomes preferable to execute the further storage service on the 8th real node even where there is additional computing resource overhead in signaling between the 1st and 8th real nodes. In a yet further iteration of the previous example, the 1st real node can be scheduled to be repaired and storage services, etc., can be in the process of being moved to other real nodes, which can cause the further instance of the storage service to be performed on another real node computing resource, e.g., it can be likely that the data of the mapped node and the instance of the corresponding storage service can be moved to the same real node, e.g., the 8th real node in this example.

Numerous other computing resource performance metrics can be determined and employed in the selective instantiation of a storage service and are to be considered within the scope of the instant subject matter even where not explicitly recited for the sake of clarity and brevity. Examples of other metrics can include, processor factors such as count, speed, etc., memory factors such as an amount of memory, speed, throughput, etc., network factors such as bandwidth, cost, latency, reliability, etc., location, reliability, monetary cost, geopolitical factors, etc. Moreover, in some embodiments, a mapped cluster can comprise storage space from more than one real cluster. In some embodiments, a mapped cluster can comprise storage space from real nodes in different geographical areas. In some embodiments, a mapped cluster can comprise storage space from more than one real cluster in more than one geographic location. As an example, a mapped cluster can comprise storage space from a cluster having hardware nodes in a data center in Denver. In a second example, a mapped cluster can comprise storage space from a first cluster having hardware nodes in a first data center in Denver and from a second cluster also having hardware nodes in the first data center in Denver. As a further example, a mapped cluster can comprise storage space from both a cluster having hardware nodes in a first data center in Denver and a second data center in Denver. As a still further example, a mapped cluster can comprise storage space from a first cluster having hardware nodes in a first data center in Seattle, Wash., and a second data center having hardware nodes in Tacoma, Wash. As yet another example, a mapped cluster can comprise storage space from a first cluster having hardware nodes in a first data center in Houston, Tex., and a second cluster having hardware nods in a data center in Mosco, Russia. Accordingly, in regards to selective instantiation of storage services can comprise determining computer resource metrics that reflect the topology of one or more real clusters/nodes/disks/etc., and their supporting computing resource(s). As an example, a real cluster can comprise data storage in a first data center located in Seattle, which can be subject to earthquakes, frequent violent political events, etc., and in a second data center located in Spokane, which can be less prone to earthquakes and political events, whereby it can have a higher computing resource cost to execute a storage service in Seattle to support data physically stored in Spokane. However, where the cost of storing data in Spokane nodes can be far less costly (e.g., lower monetary cost, lower risk of loss in a political riot/earthquake, etc.), and where there can be more up-to-date computing resources in Seattle nodes, there can be situations where it can be desirable to execute a storage service instance in Seattle for data physically stored in Spokane.

In view of a cluster storage system typically employing data communication via one or more networks, often wide area networks, back haul networks, etc., reducing an amount of data communicated, e.g., more efficient data communication based on mapping of a data comprised in the storage system, can be highly beneficial. In an embodiment, determining compact data communication paths by interrogating a mapping layer representing relationships between mapped storage and real storage can be beneficial by improving data communication efficiency. Where example mapped data is stored on real extents of a second real node, a first real node can determine that data should be communicated to the second real node. In this example, the data transferred can be similar to conventional techniques. However, where the example mapped data is stored on a third real node, then data can be transferred to the third node without first traversing the second real node, which can be more efficient. In this example, the second real node, e.g., the storage service executing on the second real node, can be provided information so that the operations performed by the third real node on behalf of the second real node can be properly recorded, employed, etc., at the second real node. Moreover, where the example mapped data is actually stored at the first real node, then the data does not even need to be communicated out of the first real node, e.g., the first real node can determine from the mapping service that the data is stored at the first real node allowing intra-node access to the data. In this example, the data again does not need to traverse the second real node and, as such, data communication efficiency can be improved. Furthermore, the second real node, as before, can be informed of operations performed by the first real node so that the operations performed by the first real node on behalf of the second real node can be properly recorded, employed, etc., at the second real node which supports the data physically stored at an extent of the first real node. These several examples can be followed in more detail by referring to FIG. 3 to FIG. 5, etc.

Additionally, accessing the mapping service local to a real node, e.g., performing an I/O operation based on mapping information accessed via an MLC instance local to a real node requesting the I/O operation, can further provide an excellent point of control for supporting I/O operation allocation. In an embodiment, performance of I/O operations can be made proportional to an amount of a node employed by a mapped cluster. As an example, if half of the storage of a real node is allocated to a first mapped node and the other half of the storage of the real node is allocated to a second mapped node, then I/O operations can be allocated 50% to the first mapped node and 50% to the second mapped node. Accordingly, when a backlog of I/O operations occurs, e.g., the first and second mapped nodes are both busy, then the real node can apportion I/O operations half to the first mapped node and half to the second mapped node to prevent one of the two mapped nodes from dominating the I/O of the real node.

Embodiments of the present disclosure can employ a global namespace for real disks and their extents in a real cluster. As such, a disk extent can have a unique name/ID. The unique ID can be employed to address disk extents for input/output (I/O) operations. Accordingly, if an instance of a mapping service storage services request disk I/O and detects that the disk extent belongs to a real disk that is physically connected to the current real node, the instance can perform a local disk I/O operation(s). However, where the instance of the mapping service storage services request disk I/O and does not detect that the disk extent belongs to a real disk that is physically connected to the current real node, the request can be redirected to the instance of the mapping service that runs on the real node, the real disk is connected to.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate controlling input and output operations of a doubly mapped RAIN storage system, in accordance with aspects of the subject disclosure. System 100 can comprise a cluster storage construct 102, which can be embodied in a cluster storage system. In an embodiment, cluster storage construct 102 can be embodied in a real cluster storage system comprising one or more hardware nodes that each comprise one or more storage devices, e.g., hard disks, optical storage, solid state storage, etc. Moreover, each real storage device can comprise one or more extents. An extent can be a defined portion of the real storage device, e.g., a real disk can be logically divided into extents, and the extents can comprise data storage locations that can facilitate data operations according to the storage locations. It is noted that a disk of a stated size can typically comprise less than the stated size of useable storage, a common convention, wherein a portion of the stated size is generally reserved for operational overhead, e.g., a 4 TB drive may have less than 4 TB of useable storage where the drive uses a portion of the 4 TB for a basic input output system (BIOS), etc. Accordingly, the extents of a disk can also differ from the stated size for similar reasons. Extents can be of a unit size, for example, an extent can be 500 gigabytes (GB), such that a 5 terabyte (TB) disk can comprise 10 extents and an 8 TB disk can comprise 16 extents, again, as noted herein, the extents may not be exactly 500 GB due to some of the stated disk space being otherwise allocated, but the extents can be of the same unit size. In some embodiments, extents can be of other than a unit size without departing form the scope of the subject disclosure even where not discussed in more detail herein for the sake of clarity and brevity. Use of unit sized and/or non-unit sized extents, in some embodiments, can enable a real cluster to support doubly mapped clusters corresponding to extents of real disks, rather than whole real disks, wherein the doubly mapped cluster can employ part of a real disk, e.g., can correspond to part of the real disk. Moreover, an extent unit size can enable use of different sized real disks in the real cluster without complicating allocation of storage space in the doubly mapped cluster. As an example, in a singly mapped cluster, whole real disks can be mapped, e.g., a mapped disk can correspond to a whole real disk and, accordingly, it can be more complex to allocate a mapped cluster based on a real cluster having mixed disk sizes, for example, because this can result in different sizes of mapped disks that can complicate redundant data storage in the mapped cluster construct. In contrast, different sizes of real disks in a real cluster with doubly mapped cluster technology can be immaterial because the doubly mapped cluster can map equal sized extents and redundant data storage can therefore be less complex. As an example, if a real node comprises a 1 TB drive and an 8 TB drive, then a mapped node can comprise a 1 TB mapped drive and an 8 TB mapped drive which can complicate redundant storage because loss of one of the mapped drives can result in data loss unless more complex redundant data storage techniques are employed to preserve data in case of a lost mapped drive. In this example, if doubly mapped cluster technology is employed with a 1 TB extent size, then there can be 9 extents in the real drives and a doubly mapped cluster can comprise two four extent doubly mapped disks allowing for less complex data redundant storage techniques to be employed. Additionally, for this example, the granular size is 9 TB in the singly mapped cluster, and can be as low as 2 TB in the doubly mapped cluster.

In system 100, cluster storage construct 102 can receive data for storage in a mapped cluster, e.g., data for storage in RAIN cluster storage system 104, etc., hereinafter data 104 for brevity. Data 104 can be stored by portions of the one or more storage devices of cluster storage construct 102 according to a logical mapping of the storage space, e.g., according to one or more doubly mapped clusters. In an embodiment, a doubly mapped cluster can be a logical allocation of storage space comprised in cluster storage construct 102. In an embodiment, a portion, e.g., addressable storage element, of an extent of a real disk can be comprised in an extent of a real disk that can be comprised in a real node that can be comprised in a real cluster and, furthermore, an addressable storage element of the real cluster can correspond to a portion of a doubly mapped cluster, etc. Accordingly, in an embodiment, cluster storage construct 102 can support a doubly mapped cluster enabling data 104 to be stored on one or more addressable storage element of an extent, e.g., first extent component 150 through L-th extent 158, of a real disk, e.g., first disk 130 through M-th disk component 138 of a real cluster, e.g., first cluster node component 120 through N-th cluster node component 128 of a cluster storage component (CSC), e.g., first CSC 110 through P-th CSC 118, and correspond to a doubly mapped cluster schema. Whereas each disk comprises extents, e.g., first disk component 130 comprises first extent component 150 through L-th extent component 158, first disk component 140 comprises first extent component 160 through L-th extent component 168, etc., the total number of extents of cluster storage construct 102 can be determined by summing the number of extents in each disk of each node of each cluster for all clusters, nodes, and disks, e.g., for a single cluster system, an 8×8×8 cluster can have 512 extents of a determined size. A mapped cluster control component, e.g., mapped cluster control component 220, etc., can coordinate storage of data 104 on storage elements of a real cluster of cluster storage construct 102 according to relationships between the mapped data storage space and the real data storage space, e.g., mapped cluster control component 220, etc., can indicate where in cluster storage construct 102 data 104 is to be stored, cause data 104 to be stored at a location in cluster storage construct 102 based on a mapping of the mapped cluster, etc.

In an embodiment, a doubly mapped cluster built on top of cluster storage construct 102 can correspond to one or more portions of one or more real cluster, e.g., to a portion of an extent of one or more disks of one or more nodes of one or more real clusters. Moreover, the mapped cluster can be N' nodes by M' disks by L' extents in size and the one or more real clusters of cluster storage construct 102 can be N nodes by M disks by L extents in size. In some embodiments, a doubly mapped cluster can correspond to storage space from more than one real cluster, e.g., first CSC 110 through P-th CSC 118 of cluster storage construct 102. In some embodiments, a doubly mapped cluster can correspond to storage space from real nodes in different geographical areas. In some embodiments, a doubly mapped cluster can correspond to storage space from more than one real cluster in more than one geographic location. As an example, a doubly mapped cluster can correspond to storage space from a cluster having hardware nodes in a data center in Denver, e.g., where first CSC 110 is embodied in hardware of a Denver data center. In a second example, a doubly mapped cluster can correspond to storage space from a first cluster having hardware nodes in a first data center in Denver and from a second cluster also having hardware nodes in the first data center in Denver e.g., where first CSC 110 and P-th CSC 118 are embodied in hardware of a Denver data center. As a further example, a doubly mapped cluster can correspond to storage space from both a cluster having hardware nodes in a first data center in Denver and a second data center in Denver e.g., where first CSC 110 is embodied in first hardware of a first Denver data center and where P-th CSC 118 is embodied in second hardware of a second Denver data center. As a further example, a doubly mapped cluster can correspond to storage space from a first cluster having hardware nodes in a first data center in Seattle, Wash., and a second data center having hardware nodes in Tacoma, Wash., e.g., where first CSC 110 is embodied in first hardware of a first Seattle data center and where P-th CSC 118 is embodied in second hardware of a second Tacoma data center. As another example, a doubly mapped cluster can correspond to storage space from a first cluster having hardware nodes in a first data center in Houston, Tex., and a second cluster having hardware nods in a data center in Mosco, Russia e.g., where first CSC 110 is embodied in first hardware of a first Houston data center and where P-th CSC 118 is embodied in second hardware of a second Mosco data center.

In an embodiment, a mapped cluster control component, e.g., 220, etc., can allocate storage space of cluster storage component 102 based on an indicated level of granularity. In embodiments, this indicated level of granularity can be determined based on an amount of data to store, a determined level of storage space efficiency for storing data 104, a customer/subscriber agreement criterion, an amount of storage in cluster storage construct 102, network/computing resource costs, wherein costs can be monetary costs, heat costs, energy costs, maintenance costs, equipment costs, real property/rental/lease cost, or nearly any other costs. These types of information can be termed 'supplemental information', e.g., 222, etc., and said supplemental information can be used to allocate mapped storage space in a doubly mapped cluster and the corresponding space in a real cluster storage construct 102. In some embodiments, allocation can be unconstrained, e.g., any space of cluster storage component 102 can be allocated into a doubly mapped cluster. In other embodiments, constraints can be applied, e.g., a constraint can be employed by a doubly mapped cluster control component to select or reject the use of some storage space of cluster storage construct 102 when allocating a doubly mapped cluster. As an example, a first constraint can restrict allocating two doubly mapped clusters that each use a disk from the same real node because difficulty accessing the real node can result in effects on two doubly mapped clusters, a second constraint can restrict allocating two doubly mapped disks of one doubly mapped cluster from using extents from the same real disk because difficulty accessing the real disk can result in effects on the two doubly mapped disks. Other constraints can be readily appreciated, for example, based on a type of data redundancy schema, based on available/use storage space, based on network/computing resource costs, etc., and all such constraints are within the scope of the instant disclosure even where not recited for clarity and brevity.

A relationship between mapped storage space and real storage space can be embodied in mapping data that can be accessed via a mapping layer of a mapping service. In embodiments, mapping layer component (MLC) 170 can enable access to mapping data. As an example, an MLC instance can execute at a real node and can enable access to mapping data. In this example, the mapping data accessible to the MLC instance can, in some but not all embodiments, be constrained to relationship information of mapped nodes having data stored by the real node, e.g., mapping data for mapped nodes that do not store data on the real node can be extraneous to the operation of the real node. However, in some embodiments, the MLC instance can access mapping data for mapped nodes that do not store data on the real node. As such, one or more MLC instances can interact with MLC 170 to enable access to mapping layer data. In some embodiments, MLC 170 can be comprised of more than one distributed component, e.g., MLC 170 can be comprised of one or more distributed component(s). As an example, each real node, nodes 120-128, etc., of cluster storage construct 102 can comprise an MLC instance, which MLC instances can act in concert as MLC 170. Other examples are readily appreciated and are to be considered within the scope of the instant disclosure even where not explicitly recited for the sake of clarity and brevity. In some embodiments, MLC 170 can be a discrete component, a single service in execution on one or more processors, etc., that can be accessed by other component(s) acting as MLC instances. As an example, a real node can execute software acting as an MLC instance that can communicate with MLC 170 embodied in a discrete component communicatively coupled to cluster storage construct 102, to enable access to mapping data via a mapping service by the MLC instance of the real node. Again, other readily appreciable examples are within the scope of the instant disclosure even where not recited for clarity and brevity.

Figure 2:
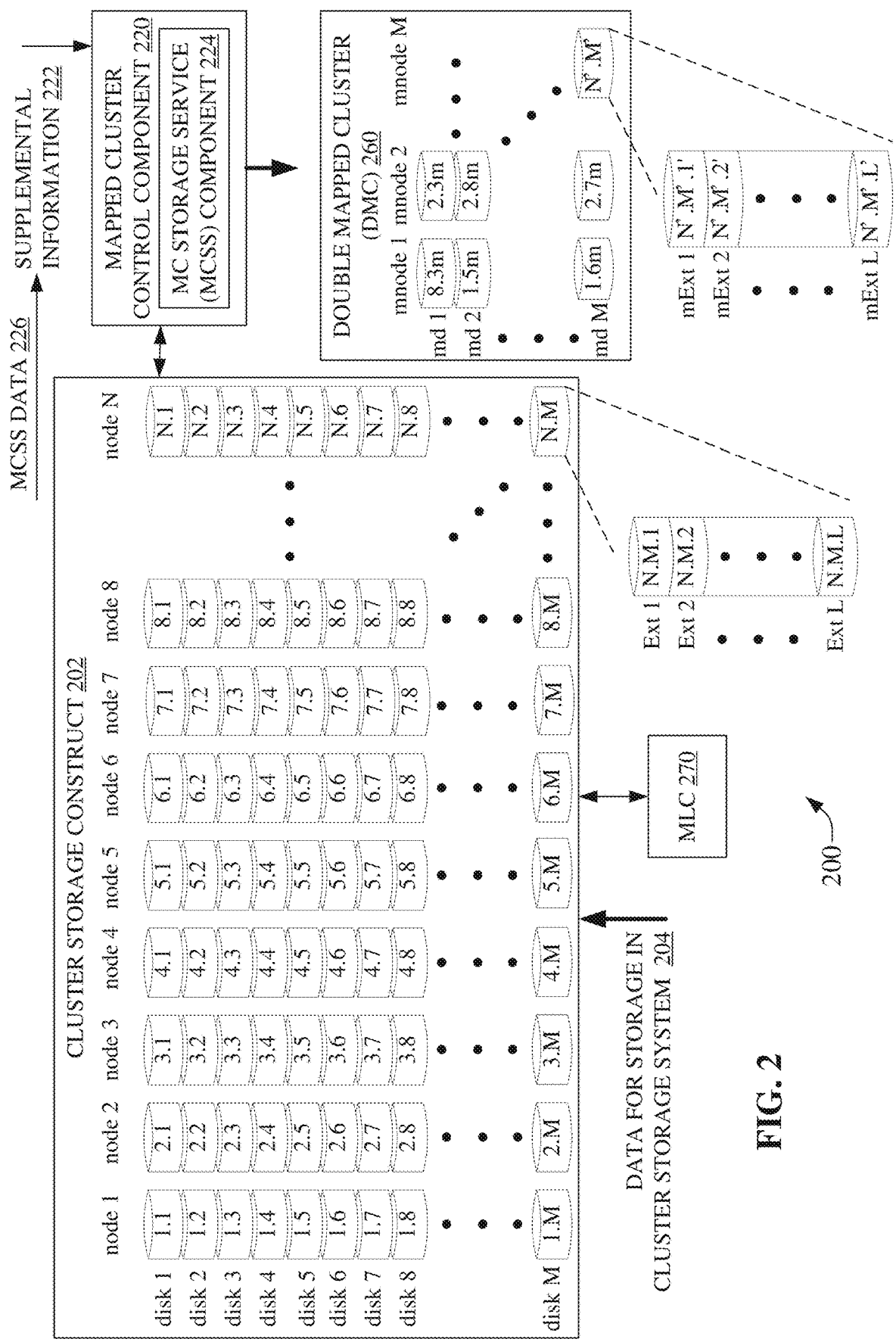
FIG. 2 is an illustration of an example embodiment that can facilitate controlling input and output operations of a doubly mapped RAIN storage system employing a mapping of mapped/logical extents to portions of real/physical disks, in accordance with aspects of the subject disclosure.

FIG. 2 is an illustration of a system 200, which can facilitate controlling input and output operations of a doubly mapped RAIN storage system employing a mapping of mapped extents to portions of real disks, in accordance with aspects of the subject disclosure. System 200 can comprise cluster storage construct 202 that can be the same as, or similar to, cluster storage construct 102. Cluster storage construct 202 can be illustrated at the disk and node level for ease of illustration, e.g., disk 1.1 can indicate real disk 1 of real node 1. As used herein, the disk, node, and extent can be typically depicted as N.M.L in real components, N'.M'.L' in mapped components, etc., such that, for example, data stored at 1.1.1 is stored at an addressable storage location of real node 1, real disk 1, real extent 1, data stored at 4'.3'.8' is stored "at" an addressable storage location corresponding to mapped node 4, mapped disk 3, mapped extent 8, etc. As is illustrated in system 200, cluster storage construct 202 can comprise N nodes of M disks, e.g., disk 1.1 to N.M, etc. Moreover, each of the M disks of the N nodes can comprise L extents, see the flyout of disk N.M of cluster storage construct 202 that comprises L extents, e.g., N.M.1 through N.M.L.

Mapped cluster control component 220 can be communicatively coupled to, or be included in, cluster storage construct 202. Mapped cluster control component 220 can allocate doubly mapped cluster (DMC) 260, which can logically embody storage comprised in cluster storage construct 202. In an embodiment, DMC 260 can be allocated based on supplemental information 222. As an example, supplemental information 222 can indicate a first amount of storage is needed and mapped cluster control component 220 can determine a number of, and identity of, extents of disks of nodes of cluster storage construct 202 to meet the first amount of storage. Mapped cluster control component 220, in this example, can accordingly allocate the identified extents, disks, and nodes of cluster storage construct 202 as corresponding to doubly mapped nodes (mnode, mn, etc.), disks (mdisk, md, etc.), and extents (mextent, mExt, etc.) of DMC 260, e.g., extents of disk 8.3 m can correlate to an allocation of extents of disk 8.3, . . . , extents of disk N'.M' can correlate to an allocation of disk N.M, etc. As such, similar to a real cluster, e.g., cluster storage construct 202, etc., DMC 260 can comprise mapped extents, for example, see flyout of doubly mapped disk N'.M' comprising mapped extents mExt 1 through mExt L, e.g ., N'.M'.1' through N'.M'.L'.

In an embodiment, mapped cluster control component 220 can comprise mapped cluster storage service (MCSS) component 224 that can cause an instance of a storage service to be instantiated. The storage service can enable interaction with data stored via a mapped disk of a mapped node, e.g., writing, reading, modifying, moving, copying, duplicating, deleting, freeing, etc., of data in a mapped cluster abstraction can be performed on data of a real disk of a real node of a real cluster via an instance of a storage service. Instantiation of the storage service for DMC 260 can be based on data relating to a topology of extents serving DMC 260, computing resource data, etc., which can be embodied in MCSS data 226 that can be comprised in supplemental information 222. In some embodiments, MCSS component 224 can be comprised in other components of system 200, other components of a storage system comprising system 200, etc., and can correspondingly receive MCSS data 226 appropriately, e.g., not comprised in supplemental information 222, etc.

A relationship between mapped storage space and real storage space embodied in mapping data can be accessed from a mapping layer via MLC 270. As is noted elsewhere herein, MLC 270 can enable access to mapping data, for example, mapping data relevant to data stored in extents of a real node performing an MLC instance. As an example, a first MLC instance executing on a first real node can enable access to mapping data for extents of the first real node, a second MLC instance executing on a second real node can enable access to mapping data for extents of the second real node, etc. It is noted, however, that some embodiments can support an MLC instance enabling access to mapping data for other real nodes. MLC 270 can therefore support MCSS 224 to access mapping data for extents of DMC 260 that are mapped to one or more extents comprised in cluster storage construct 202. This can facilitate efficient I/O operation management, proportioning of I/O operations, etc., as is disclosed herein.

In embodiments, mapped cluster control component 220 can facilitate storage of data 204, corresponding to data representations of DMC 260, in allocated storage areas of cluster storage construct 202. As such, data 204 can be stored in a more granular storage space than would conventionally be available, e.g., conventionally all disks of a node can be committed to storage, e.g., a client device is conventionally 'given' a whole real node to use, even where the 1 to M disks available in the whole real node can far exceed an amount of storage space needed by the client device. As such, by mapping portions of extents of some disks from some nodes into DMC 260, a lesser amount of storage space can be made available to the client device, for example, rather than allocating a whole real node under conventional technology, with doubly mapped RAIN technology a single extent of a single disk of a single node can be allocated, which can be significantly less storage space than the whole node. As an example, where a conventional storage cluster can allocate a minimum block of 1.2 petabytes (PB), for example in a conventional ECS storage system 1.2 PB can be the minimum storage size, this can far exceed demands of a client device in many situations. Continuing the example, a singly mapped RAIN can allocate at a whole disk level and can reduce the minimum storage size considerably. Still further in the example, doubly mapped RAIN can allocate storage at the extent level to provide still further granularity of storage space and reduce the minimum allocated space even beyond singly mapped RAIN technology. As an example, where storage can be related to storing a simple log file, storing the log file in 1.2 PB of space can be extremely inefficient use of space. Similarly, in this example, even storing the log file in several TB of disk space can be highly inefficient use of storage space. As such, allocation of storage space at the disk extent level can provide levels of granularity that are much more storage space efficient.

Figure 3:
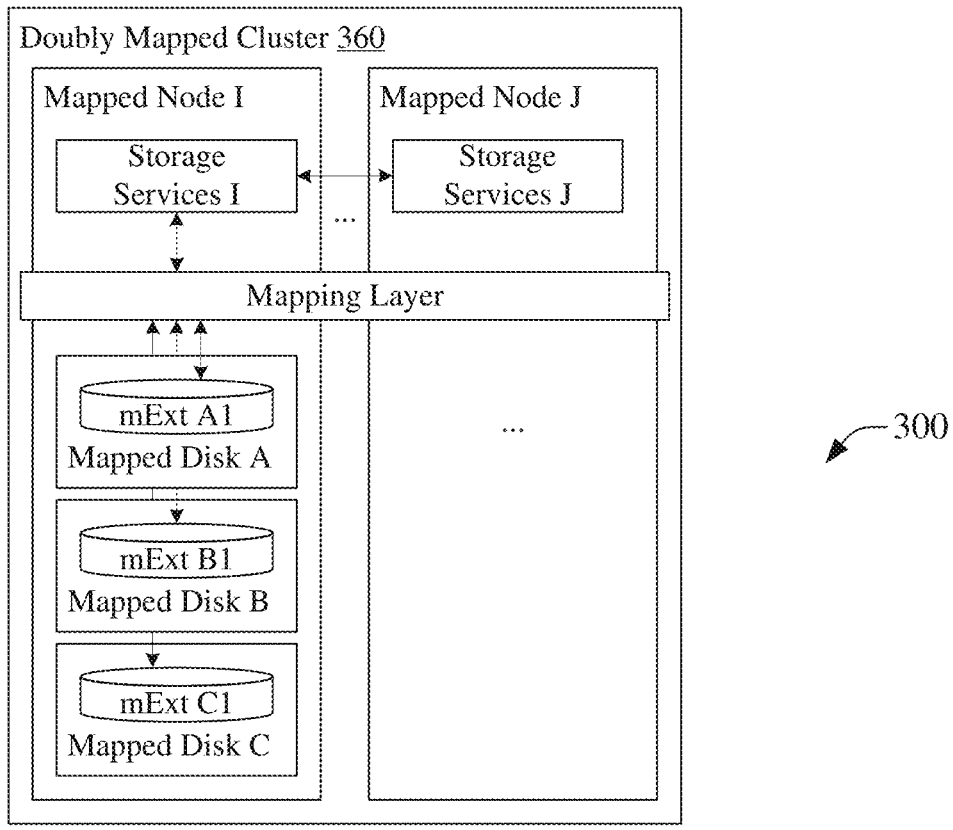
FIG. 3 is an illustration of an example embodiment that can enable controlling input and output operations of a doubly mapped RAIN storage system via a mapping layer component where a mapped extent is comprised in a real node according to a first topology, in accordance with aspects of the subject disclosure.
Figure 3:
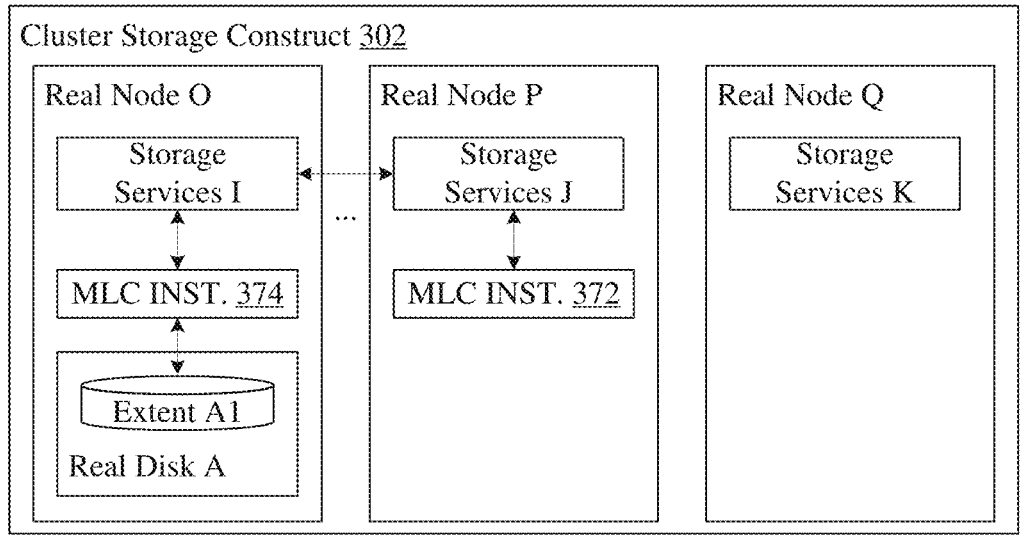

FIG. 3 is an illustration of a system 300, which can enable controlling input and output operations of a doubly mapped RAIN storage system via a mapping layer component where a mapped extent is comprised in a real node according to a first topology, in accordance with aspects of the subject disclosure. System 300 can comprise doubly mapped cluster 360 that can be the same as, or similar to DMC 260, etc. .DMC 360 can comprise mapped node I and J, as illustrated. Moreover, mapped nodes I and J of DMC 360 can be correspondingly supported by storage services I and J, which can be storage services executing on real node O and P respectively, similarly, real node Q can support execution of storage service K that is presented here for continuity and illustrated in use elsewhere herein. Mapped node I can comprise store data in mapped extents (mExt) that can be mapped to mapped disks as illustrated, e.g., mExt A1 can be comprised in mapped disk A, etc. Further, the mapping can correspond to topological features comprised in cluster storage construct 302 that can be the same as, or similar to , cluster storage construct 102, 202, etc. In system 300, for example, mExt A1 of mapped disk A can map to extent A1 of real disk A of real node O of cluster storage construct 302.

Real node O, as illustrated, can represent a topological feature wherein the mapped real extent is comprised in a same real node as a supporting storage service, e.g., storage service I can support interactions, e.g., I/O operations, etc., with data stored in extent A1 that corresponds to mExt A1 of mapped node I. In system 300, real node P can similarly support storage service J and MCL instance 372. Accordingly, storage services I, as illustrated in system 300 executing on real node O, can manage interactions of mapped node I, which can include, for example, mapping mExt A1 to real node O as in system 300, mapping mExt B1 to real node Q as in system 400, mapping mExt C1 to real node P as in system 500, etc. As such, in an example, an I/O operation to data stored in mExt A1 from storage service J, for example, reading mapped node J performing a read operation of data stored in mExt A1 of mapped node I, etc., can traditionally comprise communicating the operation, e.g., the example read operation, to storage services I, which can then access the data based on the mapping, e.g., the mapping layer illustrated in DMC 360 can be representative of accessible mapping data, then communicating the read data from mapped node I to mapped node J. In contrast, MCL instances 372 and 374 can support local access to mapping data. In embodiments employing local map data access, an I/O operation can first be employed by an MLC instance to determine if the data to be interacted with is local or not. This can support more efficient data communication. In example system 300, the example I/O operation to data stored in mExt A1 from storage service J can result in storage service J or real node P communicating to MLC instance 372 to determine if mExt A is local to real node P. Where it is determined that mExt A is not local to real node P, storage services J can communicate the operation to storage services I, which can then determine that mExt A is comprise in real node O and can then facilitate access to the data at extent A1 of real disk A. The data can then be communicated from mapped node I to mapped node J. System 300 can illustrate similar results for an I/O operation, although following a different I/O management pathway than traditional techniques, e.g., the presently disclosed local access to mapping information via one or more MLC instances is distinct from the traditional access to mapping information by only the storage service affiliated with operation of a particular mapped node. In system 300, no particular improvement in I/O efficiency is readily apparent due to the particular mapping of extent A1 to mExt A1, however, other topologies can better illustrate efficiently improvement to I/O operations, for example, as illustrated for systems 400, 500, etc.

Figure 4:
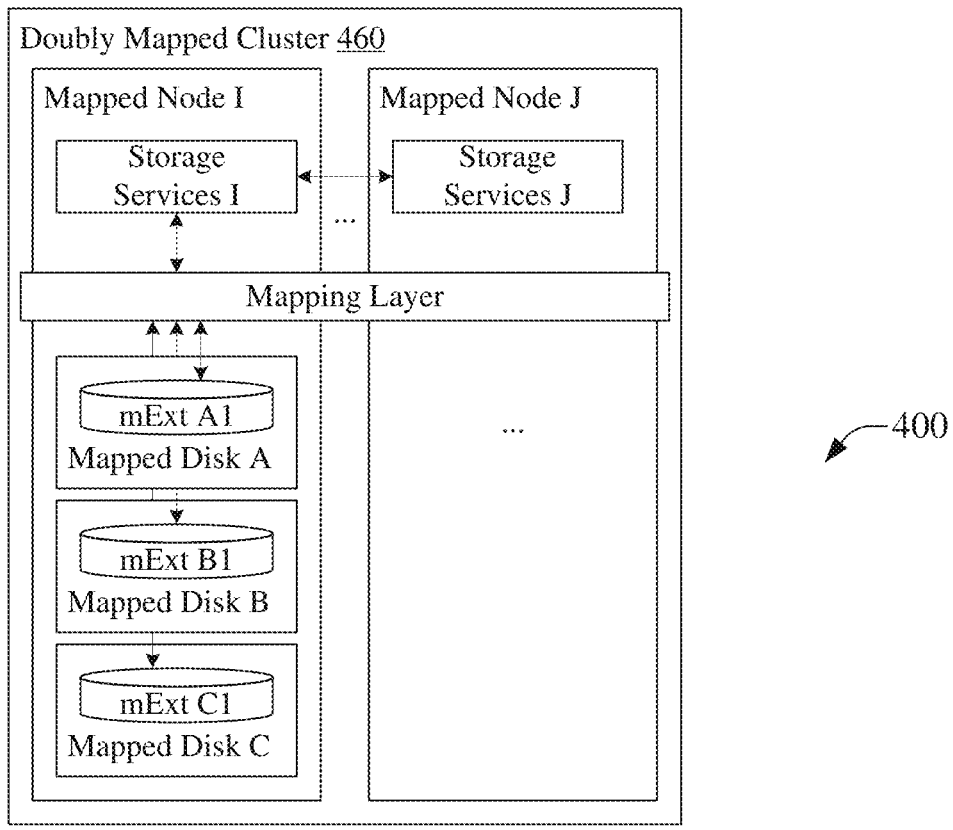
FIG. 4 is an illustration of an example embodiment that can facilitate controlling input and output operations of a doubly mapped RAIN storage system via a mapping layer component where a mapped extent is comprised in a real node according to a second topology, in accordance with aspects of the subject disclosure.
Figure 4:
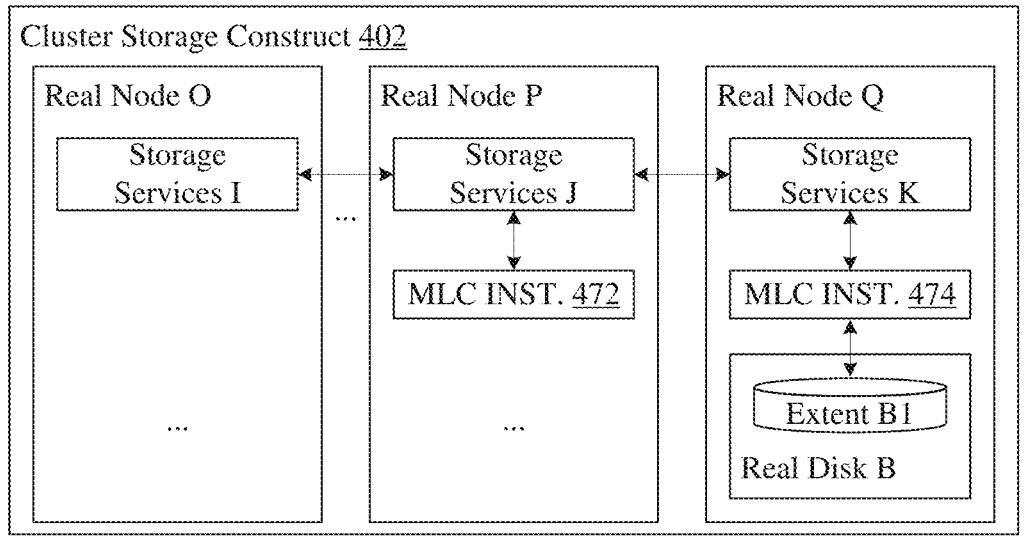

FIG. 4 is an illustration of example system 400 that can facilitate controlling input and output operations of a doubly mapped RAIN storage system via a mapping layer component where a mapped extent is comprised in a real node according to a second topology, in accordance with aspects of the subject disclosure. System 400 can comprise doubly mapped cluster 460 that can be the same as, or similar to DMC 260, 360, etc. DMC 460 can comprise mapped node I and J, as illustrated. Moreover, mapped nodes I and J of DMC 460 can be correspondingly supported by storage services I and J, which can be storage services executing on real node O and P respectively, similarly, real node Q can support execution of storage service K and MCL instance 474. Mapped node I can store data in mapped extents that can be mapped to mapped disks as illustrated, e.g., mExt B1 can be comprised in mapped disk B, etc. Further, the mapping can correspond to topological features comprised in cluster storage construct 402 that can be the same as, or similar to , cluster storage construct 102, 202, 302, etc. In system 400, for example, mExt B1 of mapped disk B can map to extent B1 of real disk B of real node Q of cluster storage construct 402.

Real node Q, as illustrated, can represent a topological feature wherein the mapped real extent is comprised in a different real node than a supporting storage service, e.g., storage service I can support interactions, e.g., I/O operations, etc., with data stored in extent B1 of real node Q and that corresponds to mExt B1 of mapped node I. In system 400, mapped node I can comprise storage space in real node Q, e.g., mExt B1 of mapped node I can map to extent B1 of real node Q, etc. As such, storage services I, as illustrated in system 400 executing on real node O, can manage interactions of mapped node I, which can include, for example, mapping mExt A1 to real node O as in system 300, mapping mExt B1 to real node Q as in system 400, mapping mExt C1 to real node P as in system 500, etc.

In system 400, real node P can similarly support storage service J and MCL instance 472. As such, in an example, an I/O operation from storage service J to data stored in mExt B1, can traditionally comprise communicating the operation to storage services I from storage service J, such that storage eservice I can then facilitate access to the data based on the mapping, e.g., real node O can determine that the data is at extent B1 of real disk B of real node Q and can then have the date read from real node Q to real node O, then communicate the read data from real node O to real node P. This can illustrate, that traditionally, there can be a lot of communications to, for example, read data from mapped node I into mapped node J, e.g., send request from P to O, then determine that the data is at Q, then read from Q to O, then read from O to P. In contrast, MCL instances 472 and 474 can support local access to mapping data. In embodiments employing local map data access, an I/O operation can first be employed by an MLC instance to determine if the data to be interacted with is local or not. This can support more efficient data communication. In example system 400, the example I/O operation for mExt B1 from storage service J can result in storage service J, at real node P, communicating to MLC instance 472 to determine if mExt B1 maps to a local extent comprised in real node P. Where it is determined that mExt B1 does not map to the local real node P, storage services J can communicate the I/O operation to storage services I, which can then determine that mExt B1 also does not map to local real node O but rather to real node Q. Subsequently, real node O can pass the I/O operation to MLC 474 of real node Q that can determine that mExt A1 maps to extent B1 local to real node Q. Real node Q can then perform the I/O operation on behalf of storage services I that manage mExt B1, and to storage service J on real node P, e.g., an example read I/O operation can read data from extent B1 on real node Q to storage services J on real node P, bypassing real node O, although real node O can be informed of the operation to enable corresponding proper recordation of the operation being performed. As can be readily appreciated, the communication of the request from real node P to real node O to real node Q can be relatively minor in comparison to reading the actual stored data, e.g., the size of the communicated operation is typically much smaller than the data accessed in the performance of the I/O operation itself. Accordingly, reading directly from Q to P and bypassing O in the presently disclosed more efficient technique can be much more data communication efficient than reading from Q to O then from O to P as in the traditional technique. System 400 can illustrate improved results for an I/O operation where the data is mapped to a real extent that is neither comprised in the requesting real node, nor comprised in the managing real node.

Figure 5:
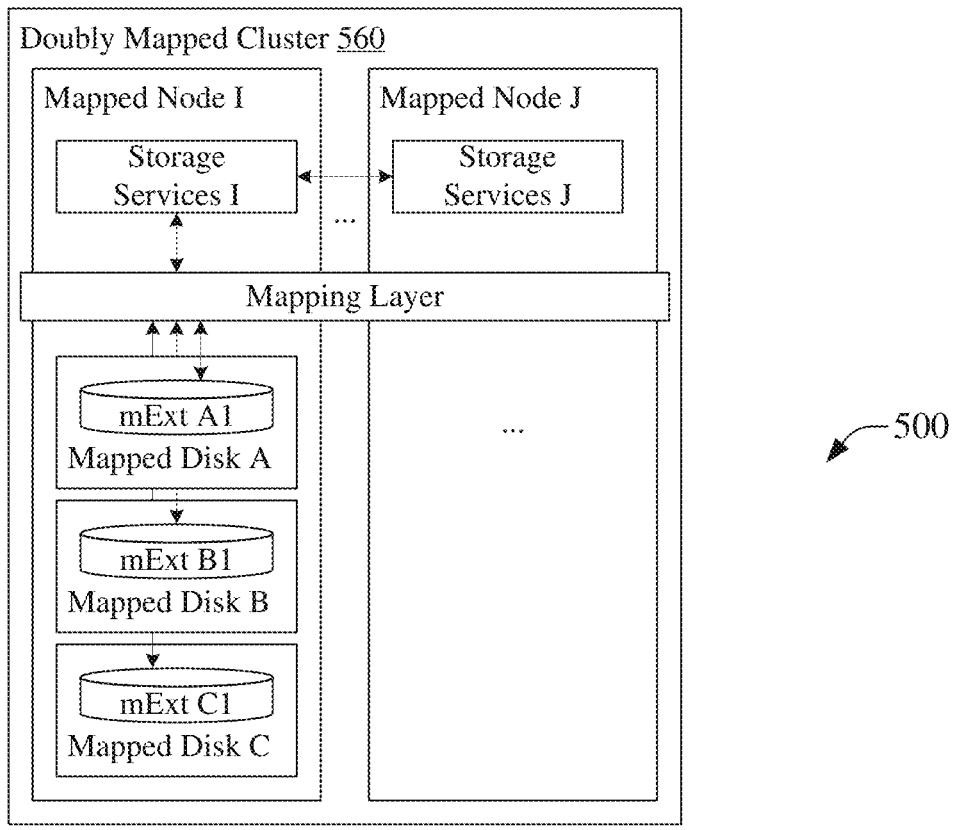
FIG. 5 is an illustration of an example embodiment that can facilitate controlling input and output operations of a doubly mapped RAIN storage system via a mapping layer component where a mapped extent is comprised in a real node according to a third topology, in accordance with aspects of the subject disclosure.
Figure 5:
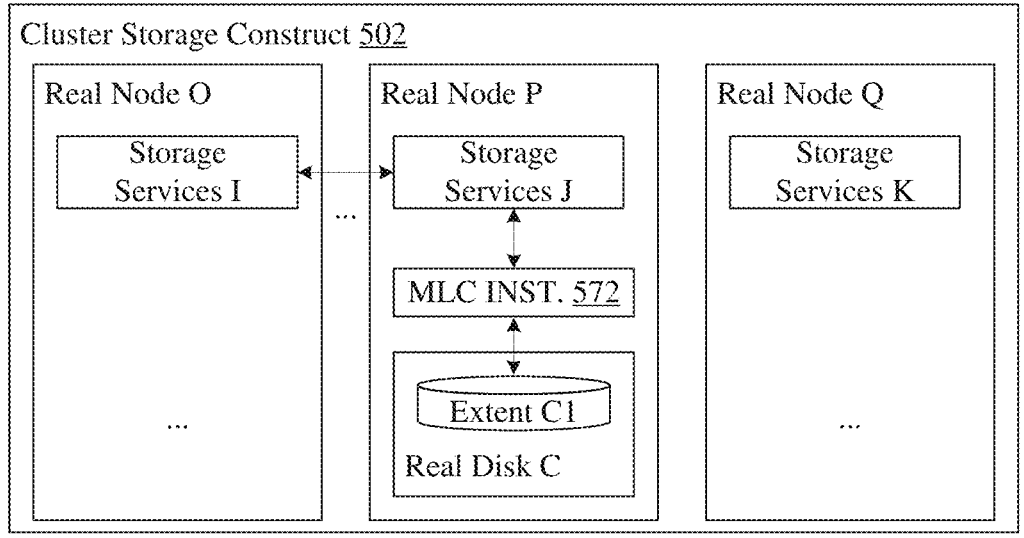

FIG. 5 is an illustration of example system 500 that can facilitate controlling input and output operations of a doubly mapped RAIN storage system via a mapping layer component where a mapped extent is comprised in a real node according to a third topology, in accordance with aspects of the subject disclosure. System 500 can comprise doubly mapped cluster 560 that can be the same as, or similar to DMC 260, 360, 460, etc. DMC 560 can comprise mapped node I and J, as illustrated. Moreover, mapped nodes I and J of DMC 560 can be correspondingly supported by storage services I and J, which can be storage services executing on real node O and P respectively, similarly, real node Q can support execution of storage service K. Mapped node I can store data in mapped extents that can be mapped to mapped disks as illustrated, e.g., mExt C1 can be comprised in mapped disk C, etc. Further, the mapping can correspond to topological features comprised in cluster storage construct 502 that can be the same as, or similar to, cluster storage construct 102, 202, 302, 402, etc. In system 500, for example, mExt C1 of mapped disk C can map to extent C1 of real disk C of real node P of cluster storage construct 502.

Real node P, as illustrated, can represent a topological feature wherein the mapped real extent is comprised in a different real node than a supporting storage service, but is in a same real node as where an I/O operation originates, e.g., storage service I can support interactions, e.g., I/O operations, etc., with data stored in extent C1 of real node P and that corresponds to mExt C1 of mapped node I. In system 500, mapped node I can comprise storage space in real node P, e.g., mExt C1 of mapped node I can map to extent C1 of real node P, etc. As such, storage services I, as illustrated in system 500 executing on real node O, can manage interactions of mapped node I, which can include, for example, mapping mExt A1 to real node O as in system 300, mapping mExt B1 to real node Q as in system 500, mapping mExt C1 to real node P as in system 500, etc.

In system 500, real node P can similarly support storage service J and MCL instance 572. As such, in an example, an I/O operation from storage service J to data stored in mExt C1, can traditionally comprise communicating the operation to storage services I from storage service J, such that storage eservice I can then facilitate access to the data based on the mapping, e.g., real node O can determine that the data is at extent C1 of real disk C of real node P and can then have the data read from real node P to real node O, then communicate the read data from real node O to real node P. This is obviously highly inefficient to read data out of a real node and then promptly read it back into the same real node. System 500 can illustrate, that traditionally, communications can be highly inefficient in some mapped node topologies. In contrast, MCL instance 572 can support local access to mapping data. In embodiments employing local map data access, an I/O operation can first be employed by an MLC instance to determine if the data to be interacted with is local or not. This can support more efficient data communication. In example system 500, the example I/O operation on mExt C1 from storage service J can result in storage service J, at real node P, communicating to MLC instance 572 to determine if mExt C1 maps to a local extent comprised in real node P. Where it is determined that real node P does indeed comprise extent C1 on real disk C, storage services J can locally perform the I/O operation bypassing real node O. Real node O can be informed of the operation by storage services J to enable corresponding proper recordation of the operation being performed to a mapped extent supported by storage services I. As can be readily appreciated, avoiding communication of data from extent C1 to real node O then from real node O back to storage services J of real node P, e.g., by locally reading from extent C1 to storage services J within real node P, can be much more efficient. As such, system 500 can illustrate improved results for performing an I/O operation where the data is mapped to a real extent that is local to a requesting real node.

Figure 6:
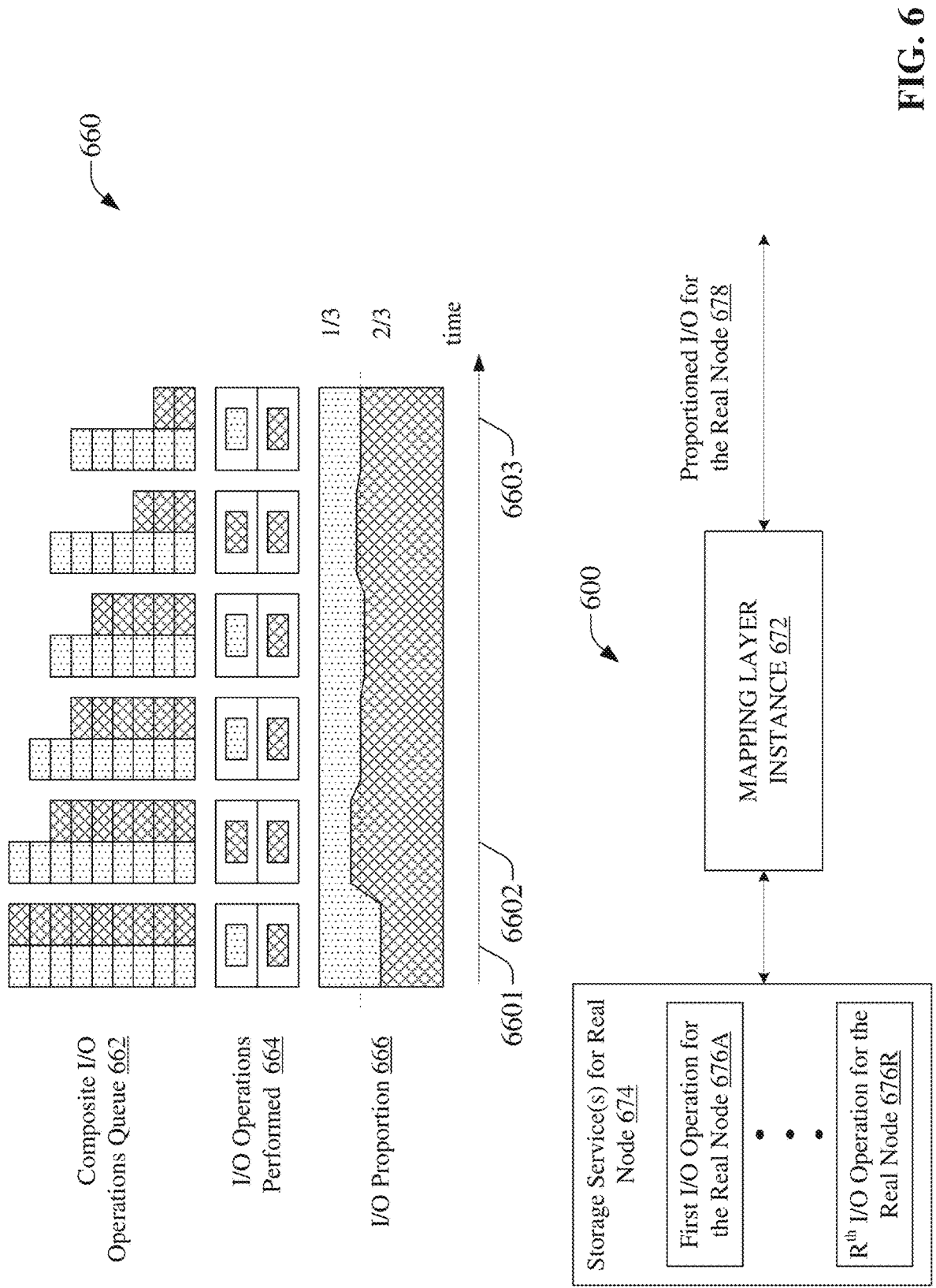
FIG. 6 is an illustration of an example embodiment facilitating controlling a proportion of input and output operations in a doubly mapped RAIN storage system via a mapping layer, in accordance with aspects of the subject disclosure.

FIG. 6 is an illustration of example system 600 that can facilitate controlling a proportion of input and output operations in a doubly mapped RAIN storage system via a mapping layer, in accordance with aspects of the subject disclosure. System 600 can comprise mapping layer instance 672. Mapping layer instance 672 can facilitate access to mapping information for mapped nodes of a mapped cluster that is mapped to real extents of a real cluster. Access to mapping data can be via mapping layer instance 720, e.g., an MLC instance, accessing a mapping service of a cluster storage construct, e.g., 102, 202, 302, 402, 502, etc.

In embodiments of the disclosed subject matter, a real node can comprise storage elements that can participate in one or more mapped clusters. As an example, a real node can comprise extents and a first portion of the extents can map to a first mapped node of a first mapped cluster, a second portion of the extents can map to a second mapped node of a second mapped cluster, etc. In this example, the real cluster can be said to support at least the two example mapped clusters. In this example, the second portion can be twice the size of the first portion such that the proportion of storage space used is ⅓ by the first mapped cluster and ⅔ by the second mapped cluster. It is noted that this example is limited for clarity and brevity to only the proportionality of the first and second mapped clusters' use of the real node and that there can be other examples in which additional mapped clusters that can also use other storage space of the real cluster without departing from the scope of the instant disclosure. The mapped clusters can be associated with I/O operations. These I/O operations, e.g., first I/O operation for the real node 676A (first I/O 676A) to $r^{th}$ I/O operation for the real node 676R (r-th I/O 676R) can be accumulated in a composite queue, e.g., composite I/O operations queue illustrated at 660.

In an embodiment, I/O operations can be passed through mapping layer instance 672 to determine if a real extent has been used in relation to an I/O operation on mapped data, as is discussed at length hereinabove. As such, I/O operations for the real node can all be understood to pass through the mapping layer instance 672. Accordingly, mapping layer instance 672 can determine a proportion of I/O operations performed and, based on this proportion reflected in I/O proportion 666, can direct what next I/O operation can be performed at the real node, e.g., as proportioned I/O for the real node 678, which can be reflected at I/O operations performed 664. As an example, where a last set of I/O operations from the composite I/O operations queue 662 comprises one operation for the dotted fill, hereinafter first mapped cluster supported by the real node, and one for the crosshatch fill, hereinafter second mapped cluster supported by the real node, then the proportion at 666 can be 50-50 as is illustrated by the graph at time 6601. It is noted that this can be less than the proportion of space used in the real cluster for said first and second mapped cluster, which in the above example was ⅓ and ⅔ correspondingly.

In response to mapping layer instance 672 determining that at time 6601 the ratio of operations performed did not match the ratio of real node space consumed by the corresponding mapped clusters, the proportioned I/O for the real node 678 can be adjusted to influence the I/O proportion 666. Accordingly, at time 6602, both I/O operations performed 664 can be for the second mapped cluster resulting in the I/O proportion 666 changing as illustrated, e.g., a 7:9 ratio remains in the composite I/O operations queue 662. The disclosed adjustment of proportioned I/O for real node 678 by mapping layer instance 672 can continue as illustrated, e.g., such that at time 6603, I/O proportion 666 can be 2:6 in the composite I/O operations queue 662 and be proportional to the real node storage space used by the two example mapped clusters. It is noted that other topologies of mapped clusters to the real node can result in different proportionalities. As an example, three mapped clusters using equal amounts of real node storage space can each be apportioned ⅓ of the I/O operations time by mapping layer instance 672. Moreover, where there are unused I/O spaces, e.g., the composite I/O operations queue 662 is partially empty, then these unused operations can be shifted to reduce other parts of the I/O operations queue.

In embodiments, the proportioning disclosed can be time proportionate. By time proportioning, e.g., in contrast to proportioning a count of I/O events. In these time proportioned embodiments, a slow disk can consume an apportioned share of I/O time which can be leveraged to enable early detection of a slow disk. This slow disk aspect may be easier to miss where proportioning of I/O is based on a count of I/O events and ignorant of a time to perform the I/O operations. Accordingly, when I/O operations load is low, disk I/O requests can be processed as they come in, e.g., in a first-in-first-out (FIFO) order, etc. The disclosed technique permits some doubly mapped clusters to use all resources while other doubly mapped clusters are idle. As I/O load increases, the size of the composite queue 662 can grows as well and mapping layer instance 672 can starts to balance disk I/O between doubly mapped clusters, e.g., via proportion I/O for real node 678. In typical embodiments, the proportion of real node space used by mapped clusters can be updatable, for example, based on a floating time window, etc. Each instance of the mapping service, e.g., 672, etc., can manage its node-local disk I/O to properly isolate doubly mapped clusters of the real node and, where they are properly isolated on each cluster node, they are also properly isolated between real clusters, e.g., mapped clusters are also properly isolated at the cluster level.

Figure 7:
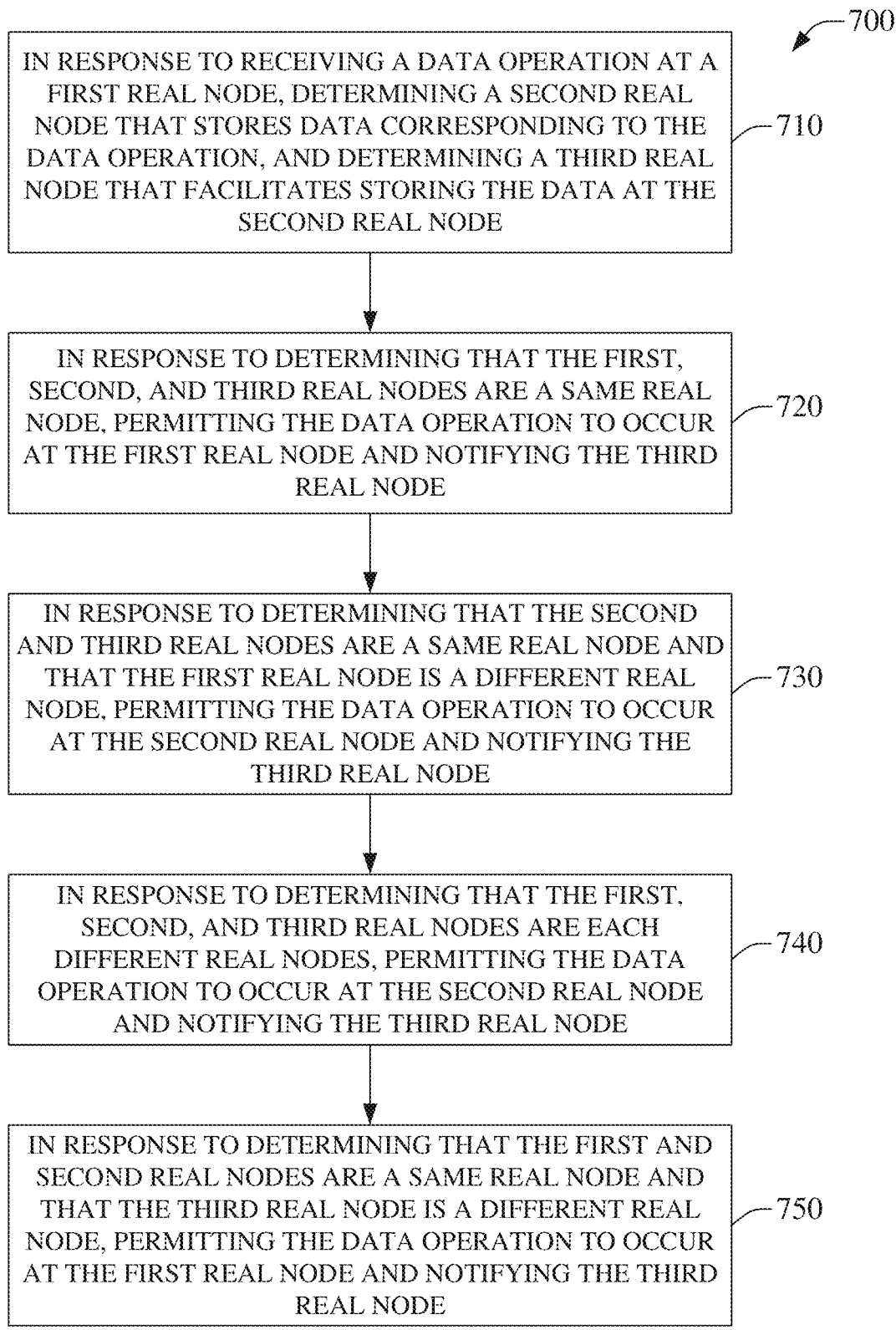
FIG. 7 is an illustration of an example embodiment facilitating controlling input and output operations of a doubly mapped RAIN storage system, in accordance with aspects of the subject disclosure.
Figure 8:
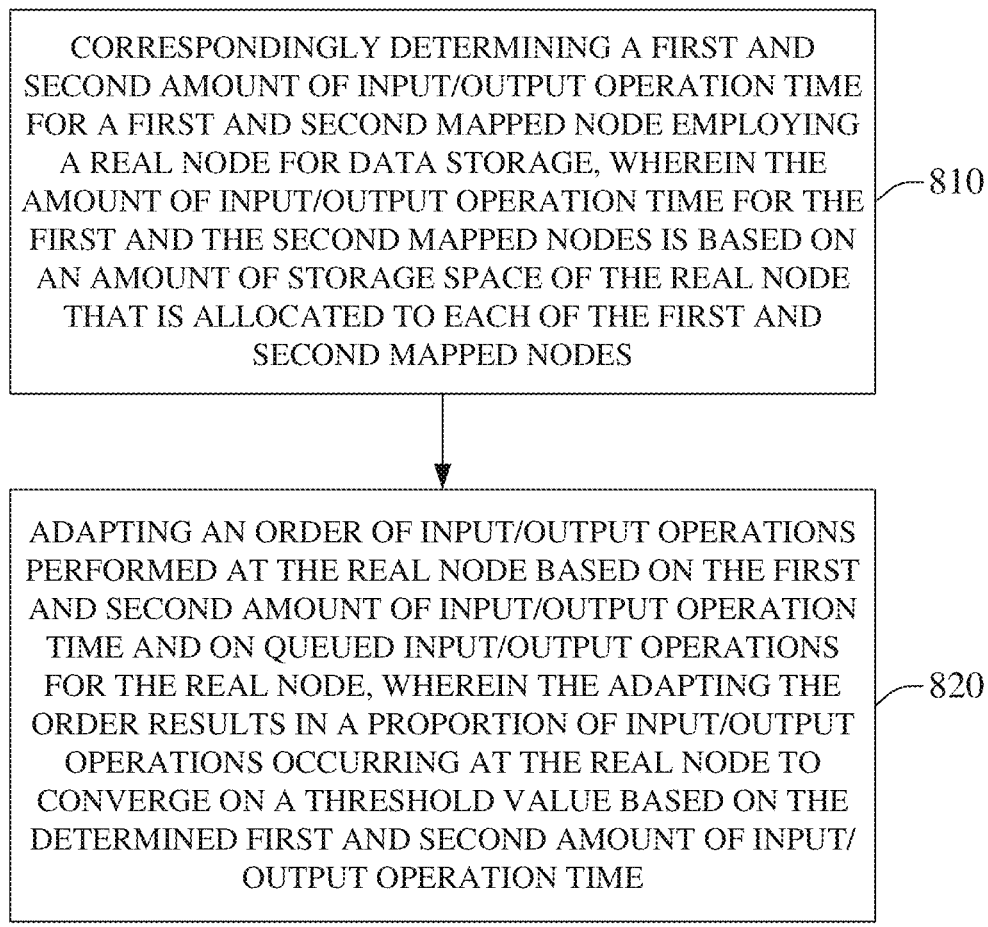
FIG. 8 illustrates an example embodiment enabling controlling a proportion of input and output operations in a doubly mapped RAIN storage system via a mapping layer, in accordance with aspects of the subject disclosure.

In view of the example system(s) described above, example method(s) that can be implemented in accordance with the disclosed subject matter can be better appreciated with reference to flowcharts in FIG. 7-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 7 is an illustration of an example method 700, facilitating controlling input and output operations of a doubly mapped RAIN storage system, in accordance with aspects of the subject disclosure. At 710, method 700 can comprise, in response to receiving a data operation at a first real node, determining a second real node that stores data. The data can correspond to the data operation. Moreover, a third real node can be determined, wherein the third real node facilitates storing the data at the second real node. As an example, a cluster storage construct, e.g., 102, 202, 302, 402, 502, etc., can comprise real nodes. In the example, a first real node can receive a data operation, e.g., an I/O operation. Moreover, a second node of the example can comprise a real extent that stores data mapped to a mapped node of a mapped cluster. In this example, a third real node can comprise a storage service(s) that can facilitate the storage of the data at the second real node, e.g., the storage service(s) can coordinate storage and access to data of the mapped cluster that is mapped to a real cluster. This example can be the same as, or similar to, the mapped and real clusters of systems 300, 400, 500, etc. The processing of the data operation received at the first real node can be dependent upon the topology of a real cluster, e.g., where data is stored, where storage services are located, and where an I/O operation is requested can impact where data is accessed and, in accord with the present disclosure, employing a mapping layer can improve communication efficiency by avoiding unnecessary data transfers between real nodes for some topologies.

At 720, method 700 can accordingly comprise permitting the data operation to occur in response to determining a first topology, e.g., in response to determining that the first, second, and third real nodes are all a same real node, the data operation can be permitted at the first node and be reported to the third real node. However, where all of the first, second, and third real nodes are the same real node, it becomes apparent that the data is stored on the same real node that manages, e.g., via a storage service instance, the corresponding mapped node, which is also the same real node that received the data operation. As such, the data operation is permitted to occur on the data and to be passed to the storage service instance of that same real node. This is not a particularly interesting topology and is included primarily for completeness.

Method 700, at 730, can then comprise, in response to determining that the second and the third real node are a same node that is a different real node than the first real node, permitting the data operation to occur at the second real node and for the third real node to be notified of the permitted data operation. This can correspond to a topology similar to, or the same as, that seen in system 300. In this topology, the data can be managed by, and stored in, a same real node, e.g., the storage service instance and extent storing the data are in the same real node, however the data operation is received at a different real node. As such, the data operation can occur at the second/third real node. It is apparent then that the storage service will be notified of the data operation occurring on the same real node. Similar to the previous topology, this topology is not particularly interesting and results in a similar outcome to conventional techniques other than a storage service of the first real node deferring performing the data operation to the storage service of the second/third real node.

Method 700, at 740, can be more interesting in that the topology can result in a situation where data communication can be performed more efficiently than in traditional data operation techniques that relegate disk operations to a storage service managing a mapped node. At 740, method 700 can comprise, in response to determining that the first, second, and third real nodes are each different real nodes, permitting the data operation to occur at the second real node and for the third real node to be notified of the permitted data operation. This topology can mirror that illustrated for system 400, for example. In this topology, rather than having the second real node perform the data operation and move the data to the third real node, which third real node would then move data to the first real node, e.g., two node hops, the method can instead have the data operation performed at the second real node and be reported to the third real node, which is just one node hop.

A third topography can be presented at 750 of method 700, which can comprise, in response to determining that the first and second real node are a same real node, and that the third real node is a different real node, permitting the data operation to occur at the first real node and for the third real node to be notified of the permitted data operation. At this point method 700 can end. This topology can mirror that illustrated for system 500, for example. In conventional techniques, this topology can result in having the first real node perform the data operation and move the data to the second real node, then the second real node would promptly move the data right back to the first real node. This traditional technique therefore uses two hops to move the data right back to where the operation was performed and is shockingly inefficient in regard to data communication. In sharp contrast, the instant method can instead perform the data operation right at the same real node as where the data operation was requested, and the corresponding data transfer can be contained within the same real node. This is much more efficient that the multiple node hops of a traditional technique applied to the same real cluster topology.

FIG. 8 is an illustration of an example method 800, facilitating controlling a proportion of input and output operations in a doubly mapped RAIN storage system via a mapping layer, in accordance with embodiments of the subject disclosure. At 810, method 800 can comprise determining a first and second amount of input/output (I/O) operation time corresponding to a first and second mapped node employing a real node for data storage. The amount of I/O operation time can be based on an amount of storage space that is allocated to each of the first and second mapped nodes from the real node. In some embodiments, there can be more than two mapped nodes employing the real node and, in such embodiments, the corresponding I/O operation times can be based on the amount of real node storage allocated to each of the several supported mapped nodes. As is illustrated in system 600, the I/O operation time can be proportional to the amount of the real node each mapped node has. As an example, a first mapped node can use ¾ of the real node and a second mapped node can use ¼ of the real node. In this example, the first mapped node can be determined to have three times as much I/O operation time as the second mapped node.

At 820, method 800 can comprise adapting an order of I/O operations performed at the real node. At this point method 800 can end. In an embodiment, the adapting can be based on the first and second amount of I/O operation time and on an amount of queued I/O operations for the real node. Referring to FIG. 6 again as an example, where there the I/O operations are already performing proportionate to the amount of storage allocated, then I/O operations can be performed FIFO. However, when there are sufficient queued I/O operations and the proportionality shifts away from a threshold level, e.g., a ratio of the amount of storage space used by the mapped nodes, etc., then the I/O operation order can be adapted to steer the performance of I/O operations towards the proportionate threshold value, e.g., the adapting can cause the I/O operations performed to converge on the threshold value. As is noted elsewhere herein, directing disk operations to be managed by real nodes based on mapping information via a mapping layer can result in each real node being capable of awareness regarding apportionment of I/O operations. As such, real nodes, and hence real clusters, can be treated as being properly isolated, such that control of I/O operations can be performed by each real node independently. This control can be based on an amount of I/O time being, for example, proportional to a relative amount of a real node used by a mapped node, such that the more of the real node is allocated to the mapped node, the more I/O time that mapped node has on the real node. Moreover, time based I/O apportionment can readily discover underperforming real nodes, e.g., slow real nodes can quickly fail to keep up with the proportional allocation of I/O operations and an error flag can promptly be set and mitigation undertaken.

Figure 9:
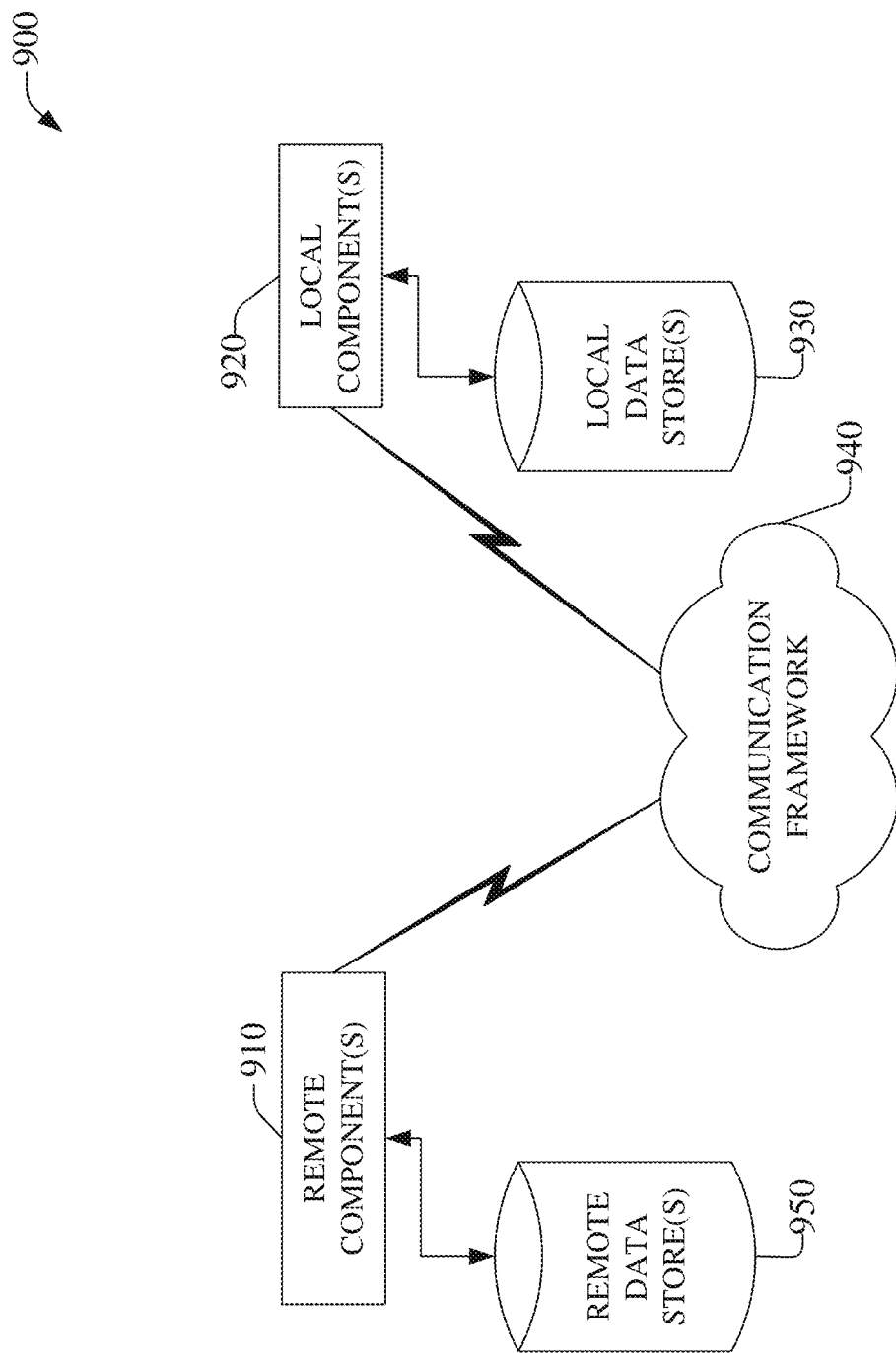
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be real nodes of a real cluster in communication with other real nodes of the real cluster that can be located in a different physical location. Communication framework 940 can comprise wired network devices, wireless network devices, mobile devices, wearable devices, radio access network devices, gateway devices, femtocell devices, servers, etc. A real cluster can be comprised of physically disparate devices, e.g., a real cluster can comprise devices in entirely different data centers, different cities, different states, different countries, etc. As an example, nodes 1-4 of cluster storage construct 202 can be located in Seattle WA, while nodes 5-6 can be located in Boston MA, and nodes 7-N can be located in Moscow Russia.

The system 900 also comprises one or more local component(s) 920. The local component(s) 920 can be hardware and/or software (e.g., threads, processes, computing devices). In some embodiments, local component(s) 920 can be real nodes of a real cluster in communication with other real nodes of the real cluster that can be located in a different physical location.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As an example, remote and local real nodes can communicate to perform I/O operations between local and remote real nodes, etc.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in a cluster storage construct 102, 202, 302, 402, 502, etc., e.g., in the nodes thereof, comprise in mapped cluster control component 220, etc., MC storage service component 224, etc., or comprised in other components disclosed herein, can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining a data operation at a first real node of a real cluster of a data storage system, a second real node of the data storage system that stores data corresponding to the data operation, and a third real node of the data storage system that executes a storage service that manages storage of the data at the second real node; and in response to determining that the first, second, and third real nodes are different real nodes, permitting the data operation at the second real node and correspondingly notifying the first and the third real node, as is disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
 a processor; and
 a memory that stores executable instructions that, when executed by the processor, facilitate performance of operations, comprising:
  determining a data operation at a first real node of a real cluster of a data storage system;
  determining a second real node of the data storage system that stores data corresponding to the data operation;
  determining a third real node of the data storage system that executes a storage service that manages storage of the data at the second real node; and
  in response to determining that the first, the second, and the third real nodes are different real nodes, permitting the data operation at the second real node and correspondingly notifying the first and the third real nodes.

2. The system of claim 1, wherein the data operation is selected from a group of operations comprising a data input operation that inputs data from the first real node into the second real node, and a data output operation that outputs data from the second real node to the first real node.

3. The system of claim 2, wherein the data input operation that inputs data from the first real node into the second real node excludes an input process, the input process comprising inputting the data from the first real node into the third real node then inputting the data from the third real node into the second real node.

4. The system of claim 2, wherein the data output operation that outputs data from the second real node to the first real node excludes an output process, the output process comprising outputting the data from the second real node to the third real node then outputting the data from the third real node to the first real node.

5. The system of claim 1, wherein the operations further comprise in response to determining that the first and the second real node are a same real node, and that the third real node is a different real node from the first and the second real node, permitting the data operation at the first real node and correspondingly notifying the third real node.

6. The system of claim 5, wherein the data operation is selected from a group of operations comprising a data input operation that inputs data into the real node embodying the first and the second real node, and a data output operation that outputs data from the real node embodying the first and the second real node.

7. The system of claim 6, wherein the data input operation excludes an input process, the input process comprising inputting the data from the first real node into the third real node and subsequently inputting the data from the third real node back into the first real node.

8. The system of claim 6, wherein the data output operation excludes an output process, the output process comprising outputting the data from the first real node to the third real node and subsequently outputting the data from the third real node back to the first real node.

9. The system of claim 1, wherein the operations further comprise:
 determining an allocation of a storage space of a fourth real node to a first mapped node and to a second mapped node;
 determining a proportional allocation of input/output times for the first mapped node and the second mapped node based on the allocation of the storage space of the fourth real node; and
 adapting an order of input/output operations in accord with the proportional allocation of input/output times.

10. The system of claim 9, wherein determining the allocation is performed via a mapping layer instance of the fourth real node, resulting in the fourth real node input/output operations being isolated from other input/output operations of other real nodes.

11. The system of claim 10, wherein the other real nodes are further each input/output operation isolated, resulting in a real cluster comprising the fourth real node and the other real nodes being input/output operation isolated.

12. A method, comprising:
 determining, by a system comprising a processor, a data operation at a first real node of a real cluster of a data storage system, a second real node of the data storage system that stores data corresponding to the data operation, and a third real node of the data storage system that executes a storage service that manages storage of the data at the second real node; and in response to determining, by the system, that the first, the second, and the third real nodes are different real nodes, permitting the data operation at the second real node and correspondingly notifying the first and the third real nodes.

13. The method of claim 12, wherein the data input operation inputs data from the first real node into the second real node and precludes the system from inputting the data from the first real node into the third real node and from subsequently inputting the data from the third real node into the second real node.

14. The method of claim 12, wherein the data output operation that outputs data from the second real node to the first real node and precludes the system from outputting the data from the second real node to the third real node and from subsequently outputting the data from the third real node to the first real node.

15. The method of claim 12, further comprising, in response to determining, by the system, that the first and the second real node are a same real node, and that the third real node is a different real node, permitting the data operation at the first real node and correspondingly notifying the third real node.

16. The method of claim 15, wherein the data operation precludes the system from inputting the data from the first real node into the third real node and from subsequently inputting the data from the third real node back into the first real node.

17. The method of claim 15, wherein data operation precludes the system from outputting the data from the first real node to the third real node and from subsequently outputting the data from the third real node back to the first real node.

18. A non-transitory machine-readable medium, comprising executable instructions that, when executed by a processor, facilitate performance of operations, comprising:

determining a data operation at a first real node of a real cluster of a data storage system, a second real node of the data storage system that stores data corresponding to the data operation, and a third real node of the data storage system that executes a storage service that manages storage of the data at the second real node; and in response to determining that the first, the second, and the third real nodes are different real nodes, permitting the data operation at the second real node and correspondingly notifying the first and the third real nodes.

19. The non-transitory machine-readable medium of claim 18, wherein the operations further comprise, in response to determining that the first and the second real node are a same real node, and that the third real node is not the same real node, permitting the data operation at the first real node and correspondingly notifying the third real node.

20. The non-transitory machine-readable medium of claim 18, wherein performance of the data operation communicates less information between real nodes as compared to when the third real node controls data operations, comprising the data operation.

\* \* \* \* \*